US010486458B2

(12) United States Patent
O'Connor

(10) Patent No.: US 10,486,458 B2
(45) Date of Patent: Nov. 26, 2019

(54) WRITE ERASABLE COMPONENT SYSTEM

(71) Applicant: Tim O'Connor, Oxford, MA (US)

(72) Inventor: Tim O'Connor, Oxford, MA (US)

( * ) Notice: Subject to any disclaimer, the term of this patent is extended or adjusted under 35 U.S.C. 154(b) by 802 days.

(21) Appl. No.: 14/479,830

(22) Filed: Sep. 8, 2014

(65) Prior Publication Data

US 2015/0056599 A1 Feb. 26, 2015

Related U.S. Application Data

(63) Continuation-in-part of application No. 13/718,515, filed on Dec. 18, 2012, now abandoned.

(51) Int. Cl.
| | | |
|---|---|---|
| *B43L 1/00* | (2006.01) | |
| *G09F 7/00* | (2006.01) | |
| *G09F 7/06* | (2006.01) | |
| *B43L 1/10* | (2006.01) | |
| *B42F 13/16* | (2006.01) | |
| *G09B 19/00* | (2006.01) | |
| *G09F 1/02* | (2006.01) | |
| *G09F 1/06* | (2006.01) | |

(52) U.S. Cl.
CPC ............. *B43L 1/00* (2013.01); *B42F 13/16* (2013.01); *B43L 1/10* (2013.01); *G09B 19/00* (2013.01); *G09F 1/02* (2013.01); *G09F 1/06* (2013.01); *G09F 7/00* (2013.01); *G09F 7/06* (2013.01)

(58) Field of Classification Search
CPC ....... B42D 5/003; B42D 15/008; G09F 15/00; G09F 15/0068; B43L 1/00
USPC .......................................................... 434/408
See application file for complete search history.

(56) References Cited

U.S. PATENT DOCUMENTS 3,279,642 A * 10/1966 Kafferlin ............... A47B 88/20
 220/543
4,081,125 A * 3/1978 Meyers ................. B65D 25/04
 206/561

(Continued)

FOREIGN PATENT DOCUMENTS

EP 1905323 A1 * 4/2008 ............. A47B 43/02

OTHER PUBLICATIONS

"Rectangular Prism," Gijs Korthals Altes, http://web.archive.org/web/20051102004645/http://www.korthalsaltes.com/pdf/rectangular_prism.pdf, Nov. 2, 2005.*

(Continued)

*Primary Examiner* — James B Hull
*Assistant Examiner* — Jennifer L Korb
(74) *Attorney, Agent, or Firm* — Bay State IP, LLC

(57) ABSTRACT

A series of devices that allow for embedding of an image as a background while also affording the user the ability to write and print on the surface, with erasable capabilities, thus providing a multifunctional product for use in numerous industries. The devices are manufactured from predominately corrugated plastic. In one embodiment a one piece, removably attachable, cabinet system and graphic display system. In an additional embodiment, a writable board, or peg board comprising a front panel and a rear panel wherein the panels are interconnected by parallel rows, or corrugations, these panels include a writable and erasable surface. The present invention relates to assemblies of corrugated systems to better serve personal, business, and educational needs.

17 Claims, 30 Drawing Sheets

(56) References Cited

U.S. PATENT DOCUMENTS

| | | | |
|---|---|---|---|
| 6,748,710 B2* | 6/2004 | Gresham | E04B 2/7425 52/242 |
| 2007/0006505 A1* | 1/2007 | Ray | G09F 7/04 40/781 |
| 2009/0090076 A1* | 4/2009 | Abusada | E04B 2/7425 52/239 |
| 2013/0045466 A1* | 2/2013 | Hudson | E04B 2/72 434/75 |

OTHER PUBLICATIONS

"How to Work with Cardboard," http://web.archive.org/web/20110320081853/http://www.ikatbag.com/2011/03/how-to-work-with-cardboard.html, Lier Koh, Mar. 20, 2011.*

* cited by examiner

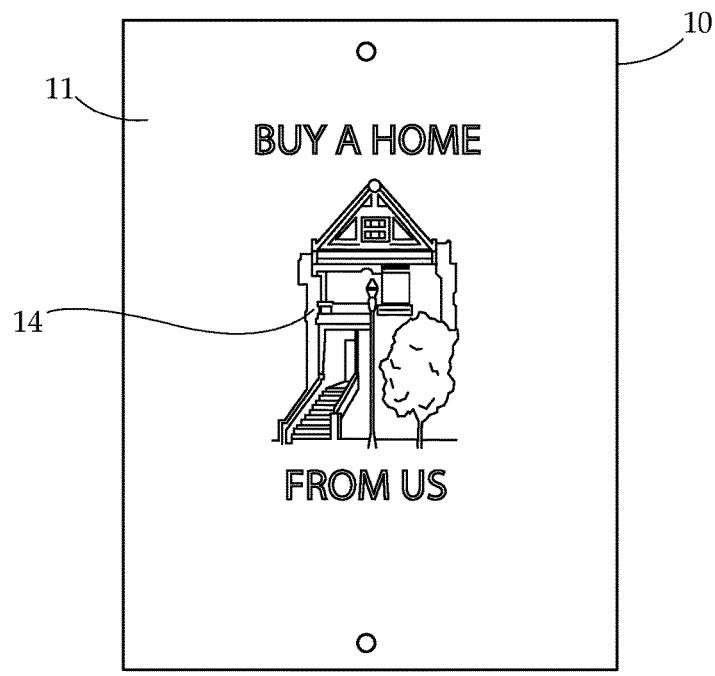
*Fig. 1A*
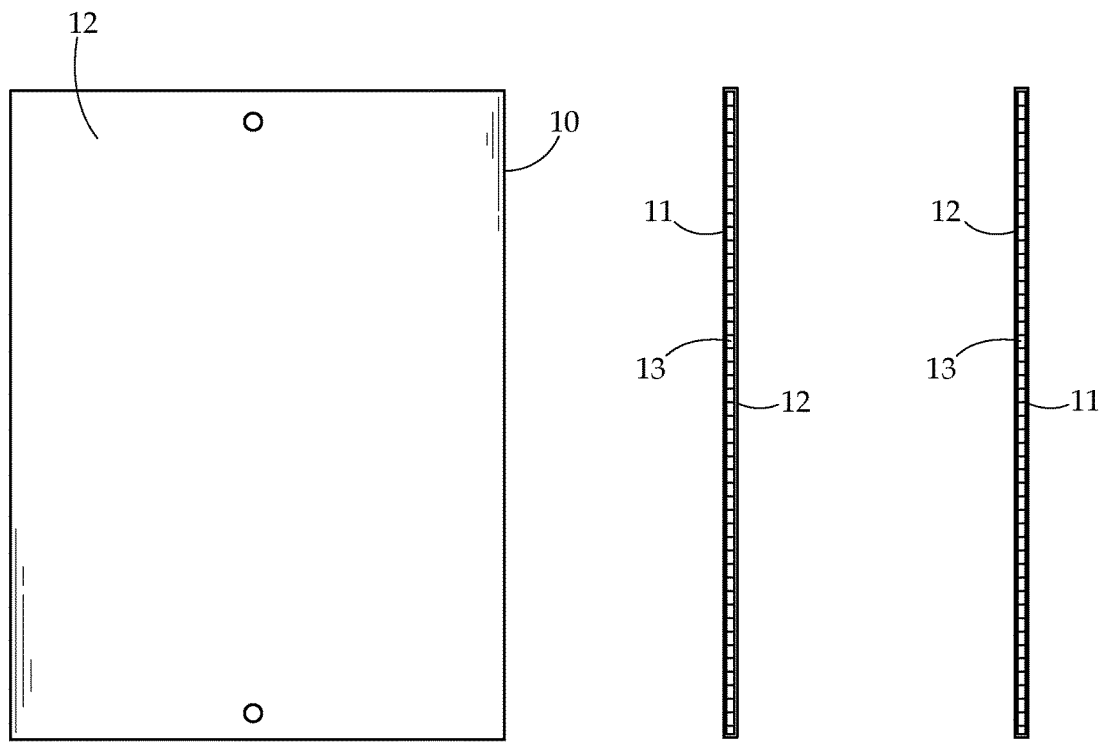
*Fig. 1B*  *Fig. 2A*  *Fig. 2B*

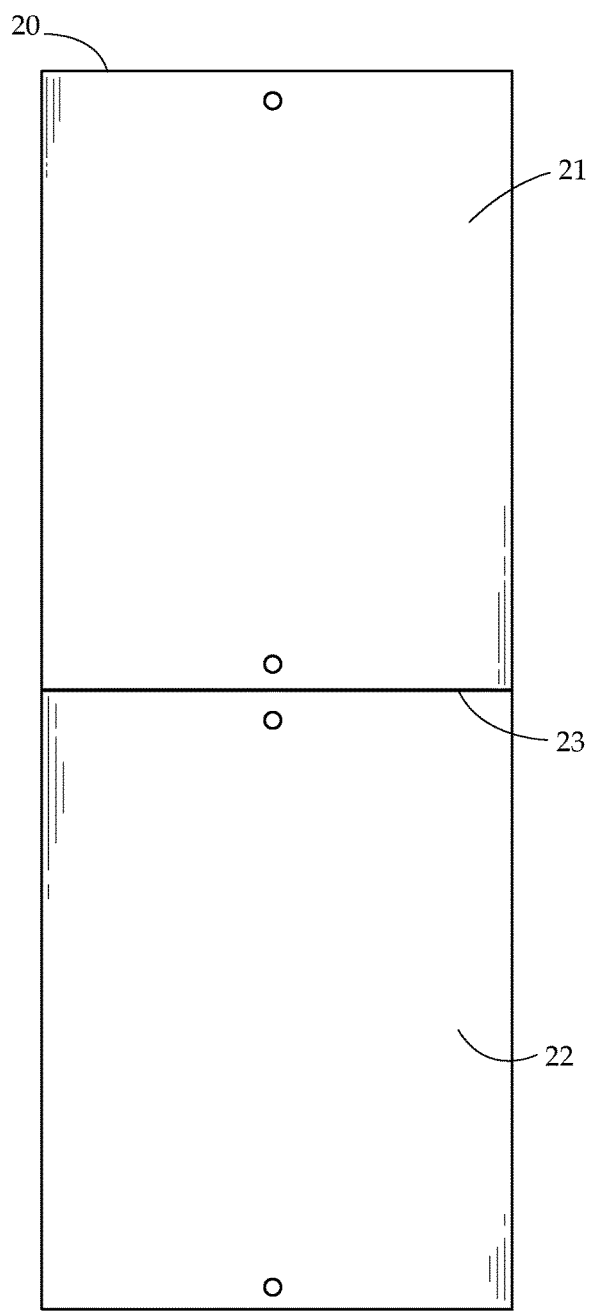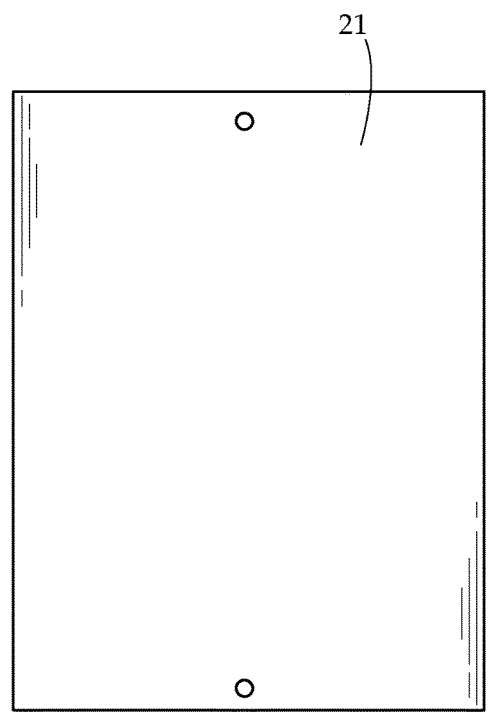
Fig. 3
Fig. 4

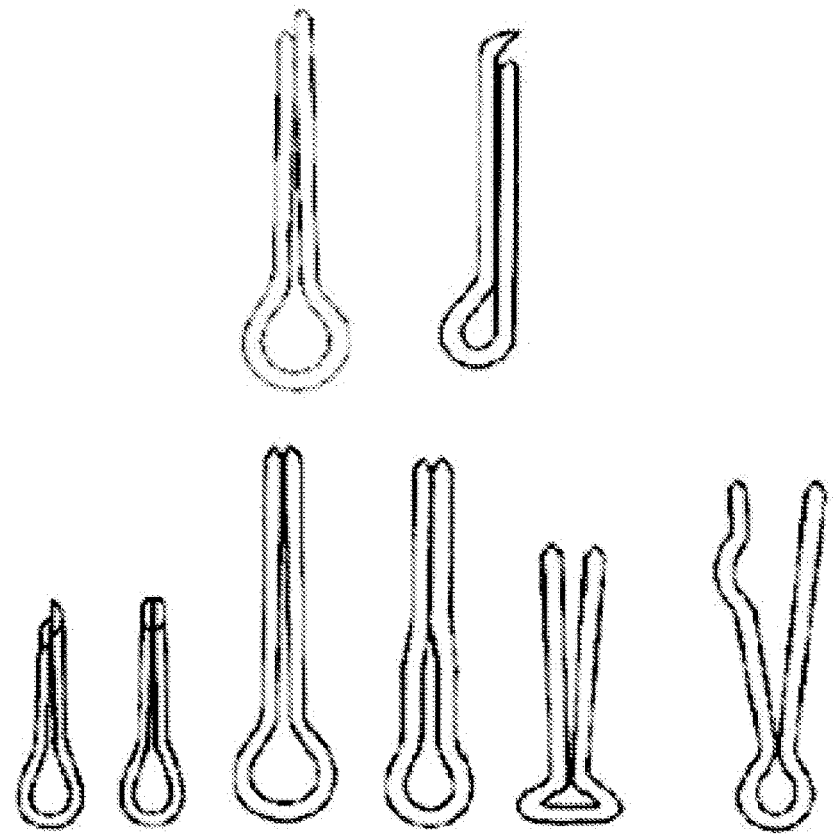
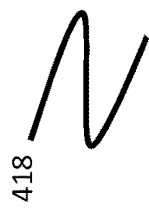
*Fig. 27*
418

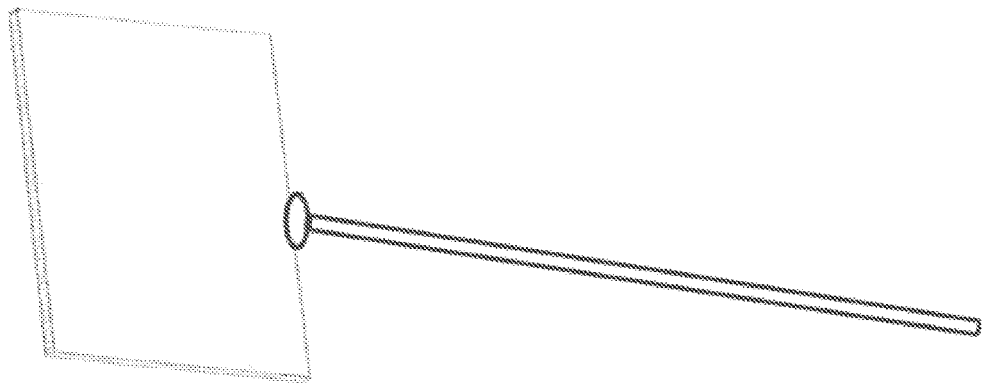
Fig. 29
430

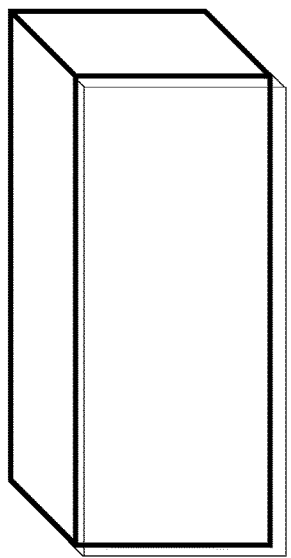
*Fig. 30*
440
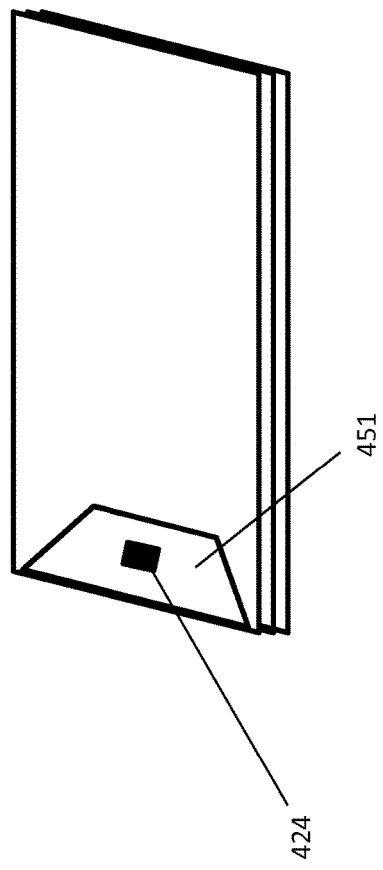
*Fig. 31*
450
451
424

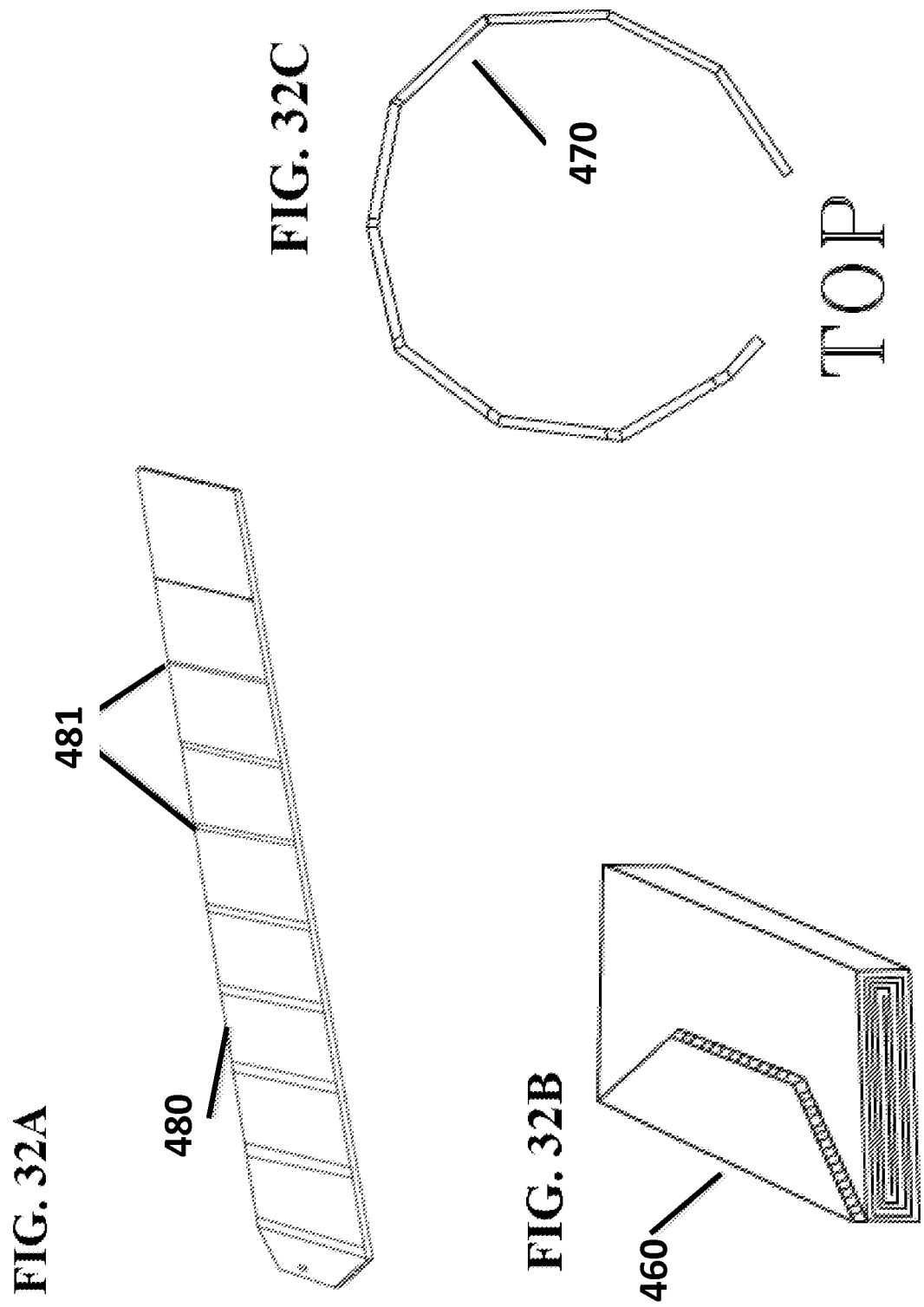

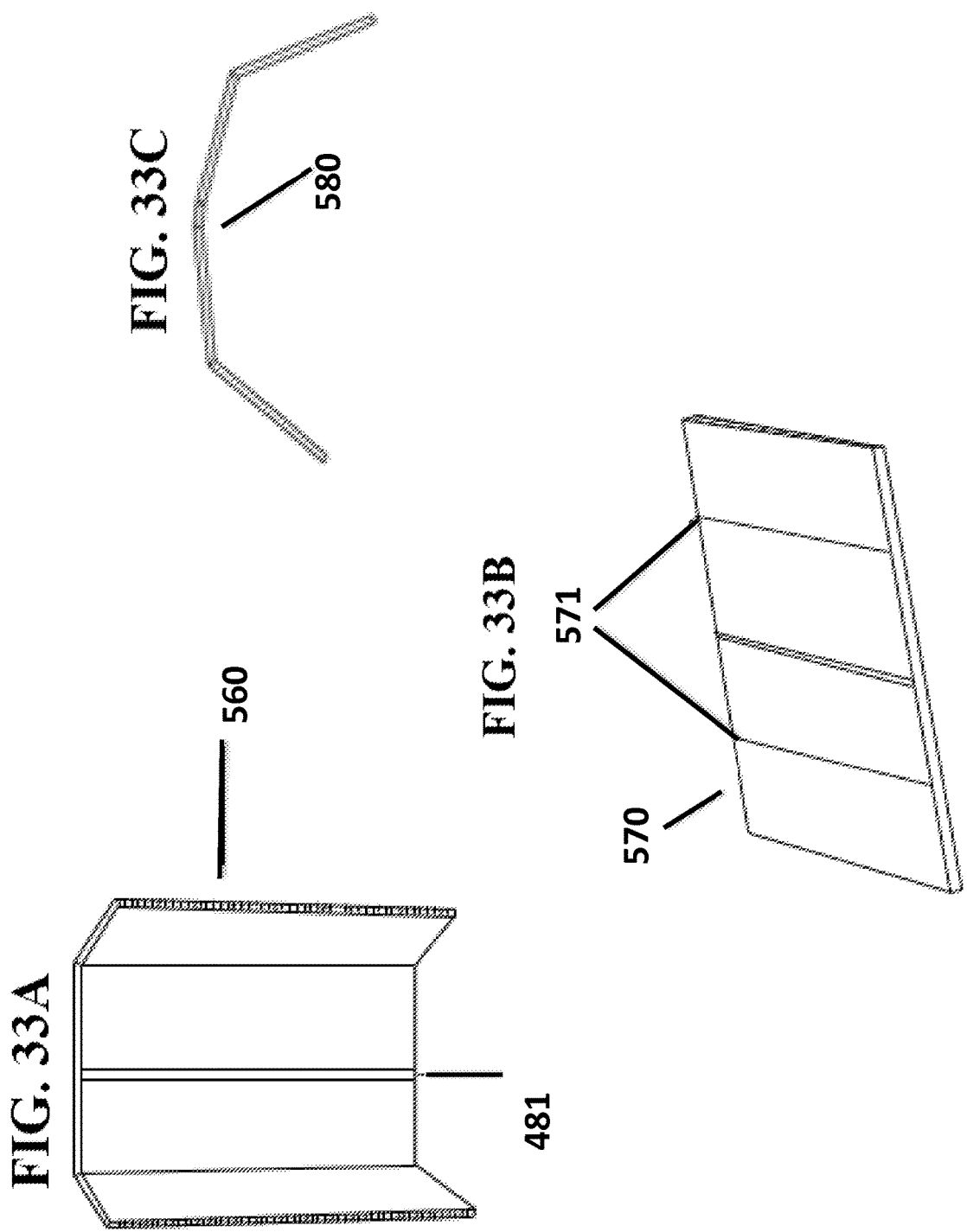

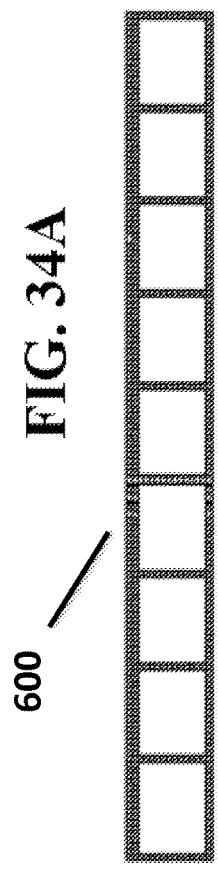
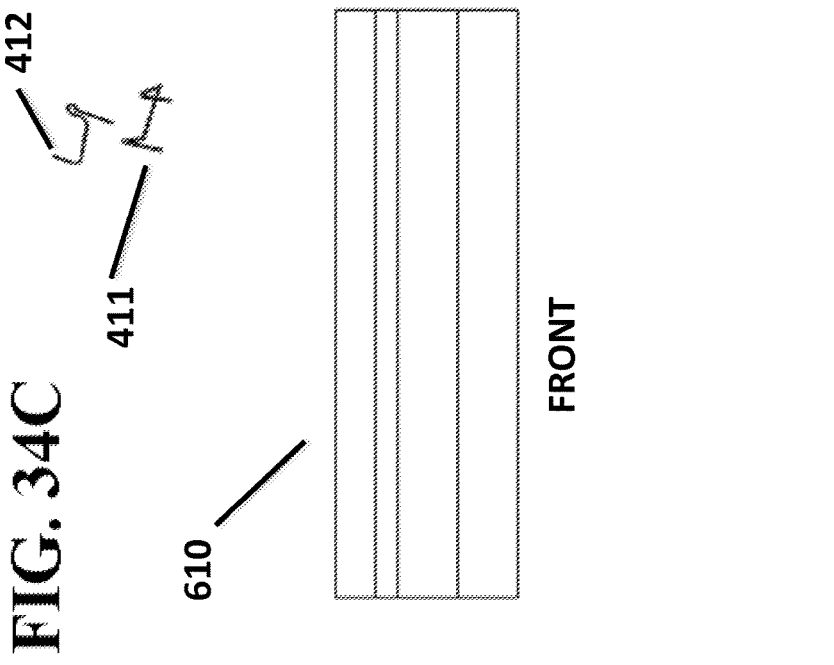
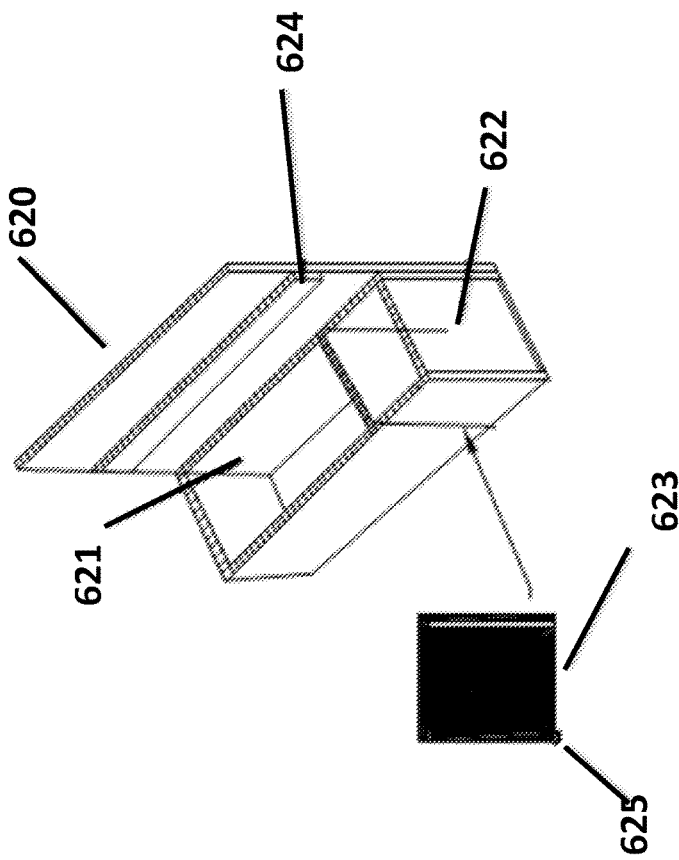

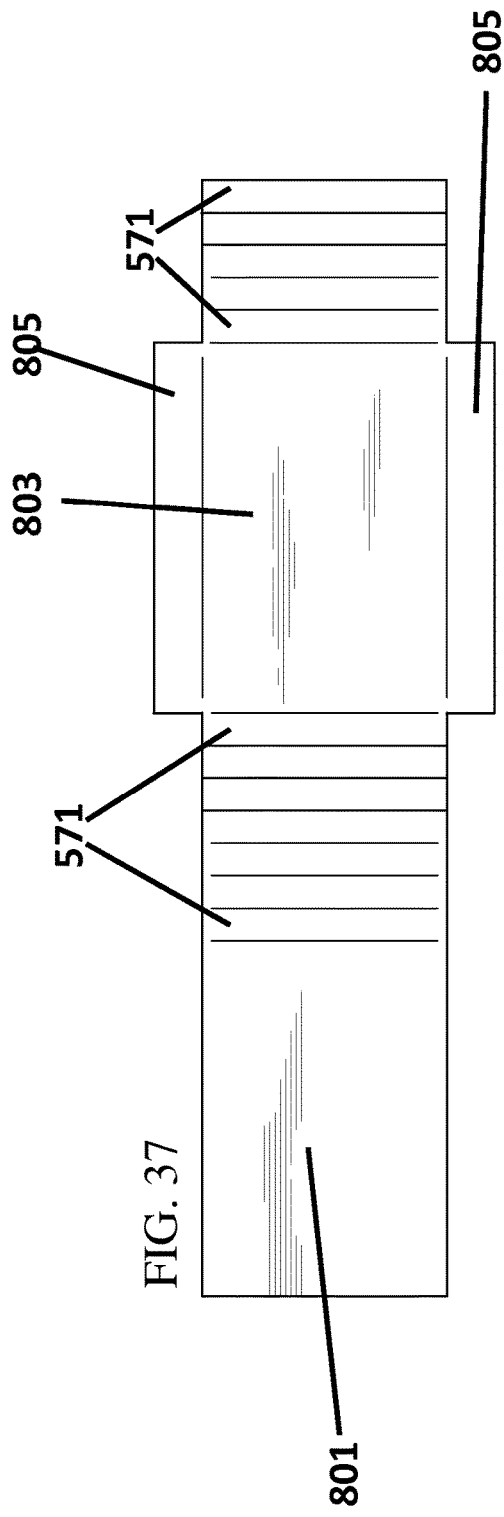
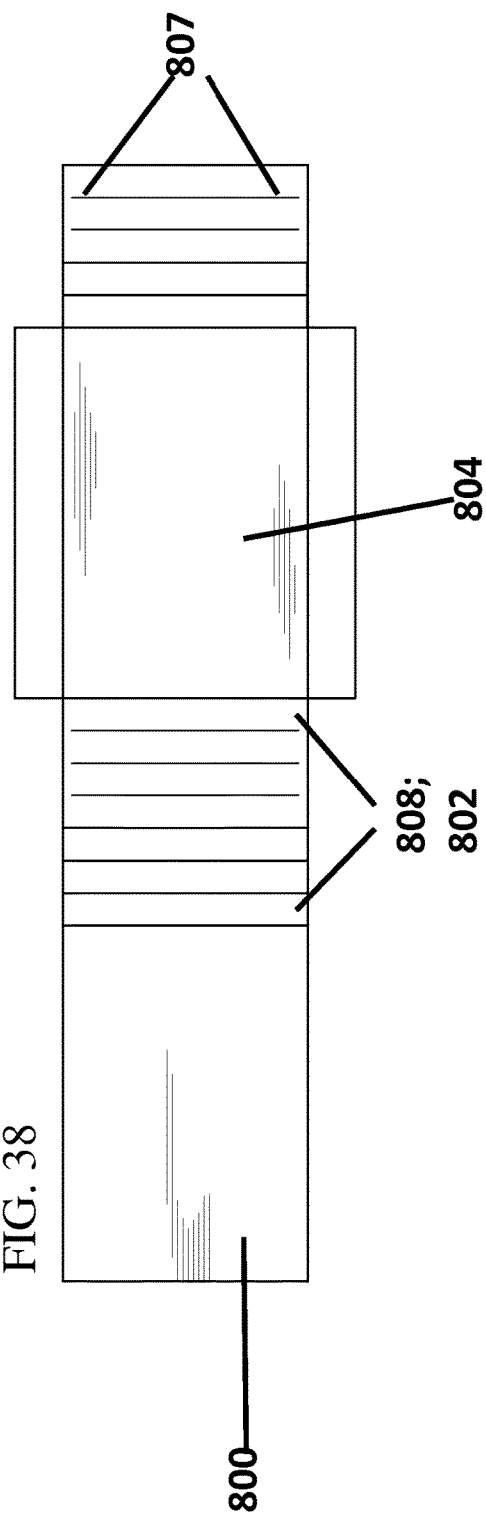
FIG. 37
FIG. 38

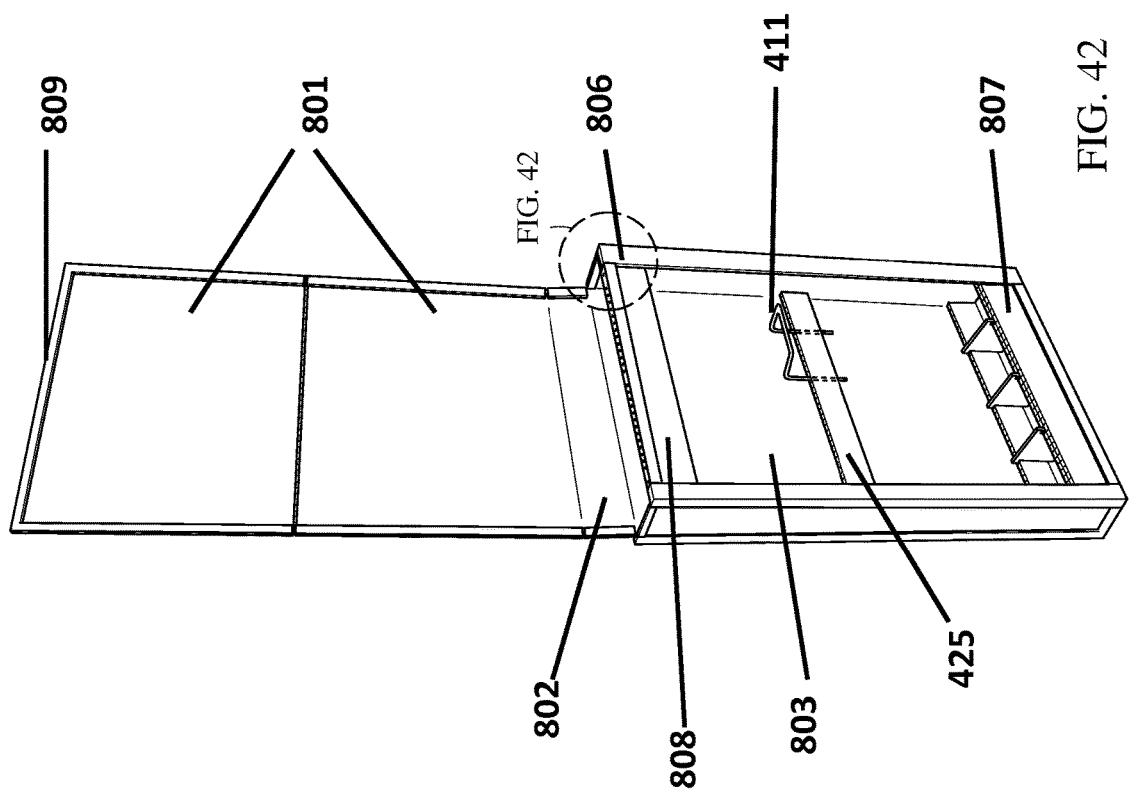

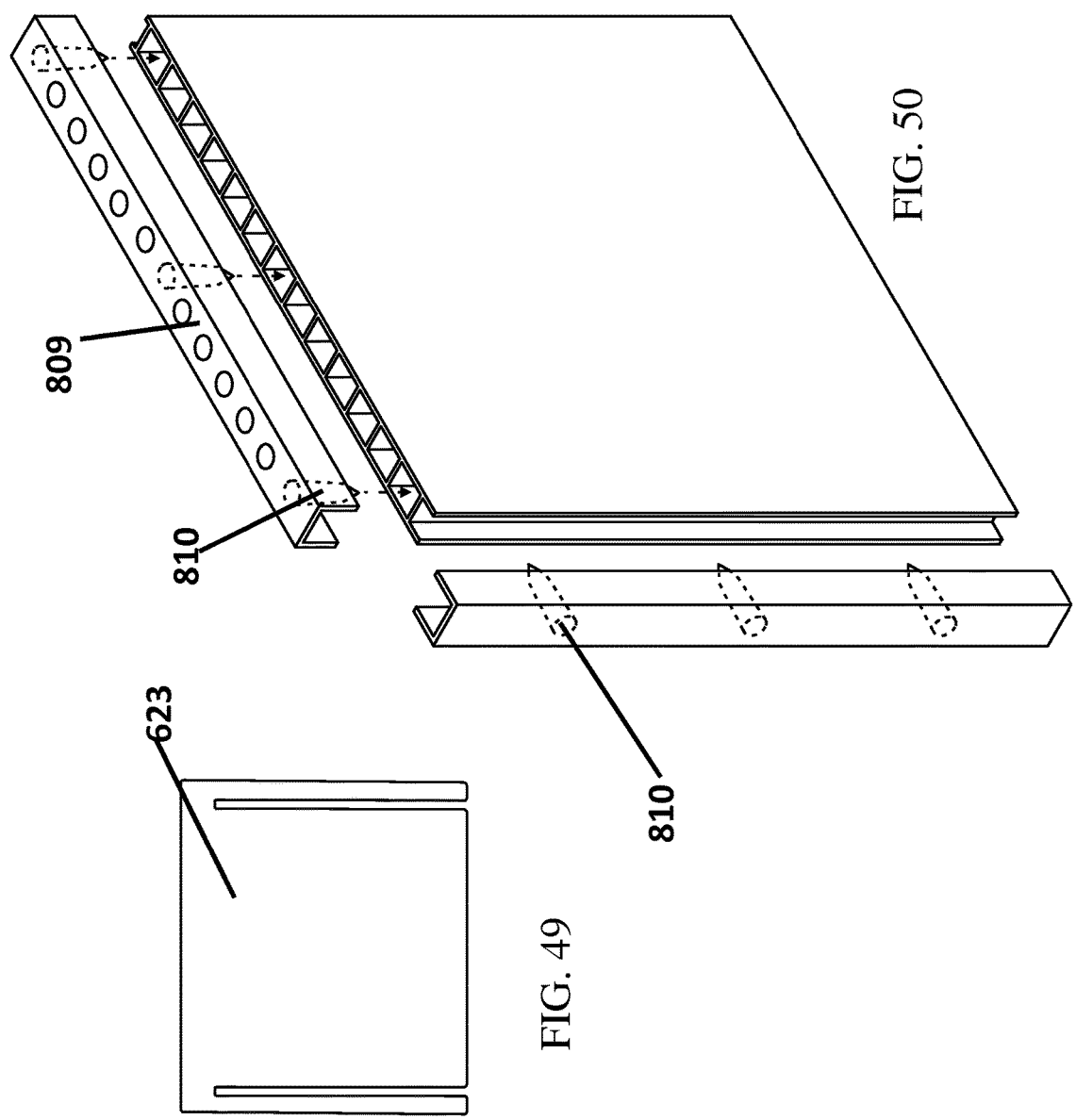

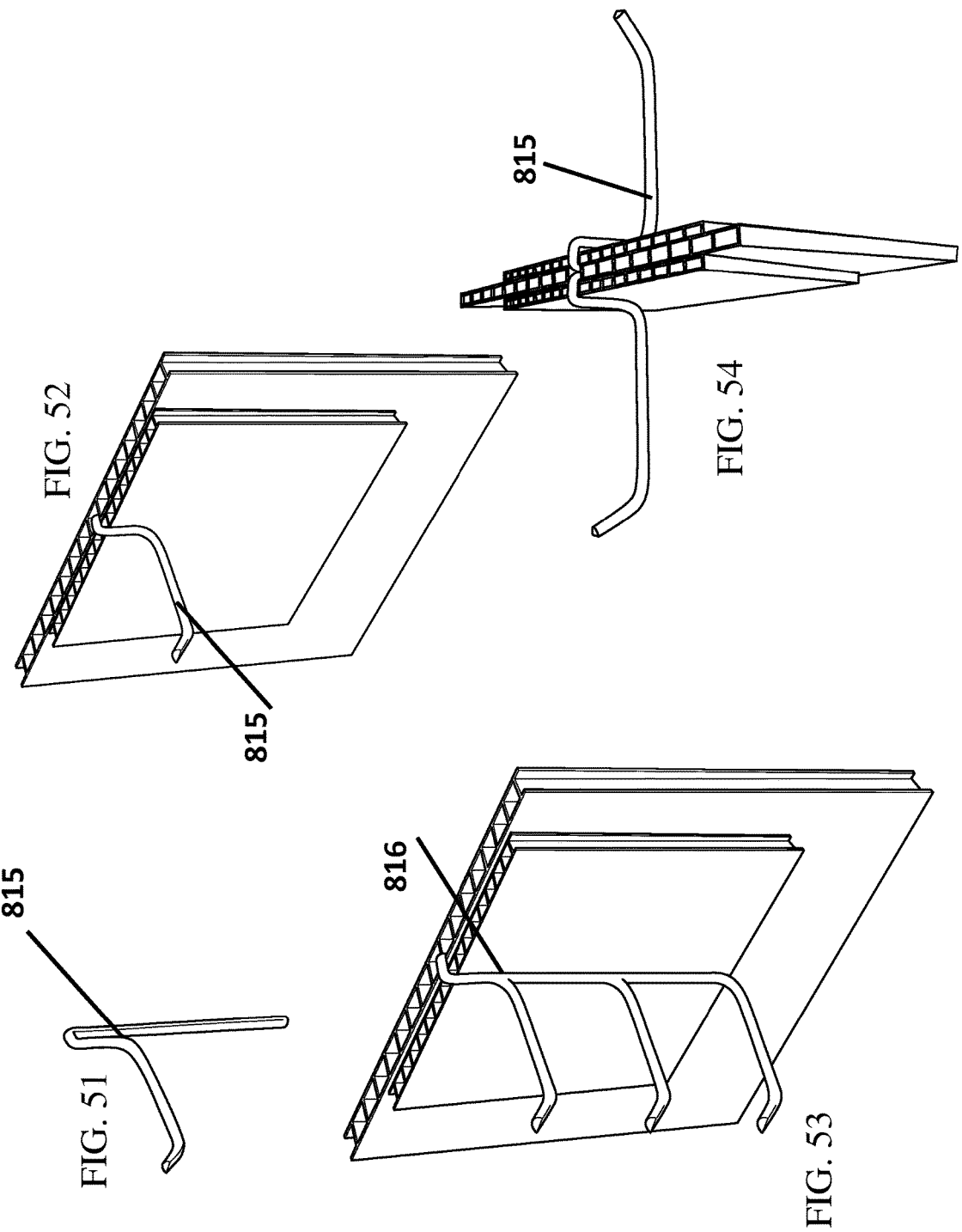

WRITE ERASABLE COMPONENT SYSTEM

CROSS REFERENCE TO RELATED APPLICATION

This application is a Continuation-in-part application and claims the benefit of and takes priority from U.S. patent application Ser. No. 13,718,515 filed on Dec. 18, 2012, the contents of which are hereby incorporated by reference.

FIELD OF THE INVENTION

The present invention relates to write erasable configurations, signage and display materials and more specifically to imaging boards capable of displaying permanent images, temporary images, as well as providing erasable capabilities, that allows the user to have a solid writing or display surface that can retain permanent ink or semi-permanent ink, allowing the user to create and recreate on one or more surfaces.

BACKGROUND OF THE INVENTION

Erasable surfaces, namely white boards or chalk boards, have long been used in office settings, construction sites and in the educational industry as well as in lower scale applications such as small business and personal use. These boards afford the user a surface that the user can write on and once finished, erase the written matter, rendering the surface clean and revealing any embedded image.

However, when white boards or similar erasable surfaces are used continuously for long periods of time, the surface can retain ink from the erasable markers, and the surface can chip, wear generally, or lose the ability to erase. The expense of replacing white boards, particularly the large wall boards used in classrooms and business conference rooms, is high, as is maintenance and installation. Due to the size and weight of these boards professional labor is required.

Concurrent systems and designs have attempted to solve this problem by creating individual white boards that are lighter weight and more easily replaced, but these boards do not cover the need for large surface writing. Similarly concurrent systems and designs have created stick-on thin erasable surfaces that can peel away and be replaced. However, these surfaces lack durability and longevity. Ultimately, there is a need for a durable erasable surface that does not carry the expense of traditional surfaces and can not only last longer but can more easily be replaced.

Also, concurrent erasable surfaces can often be easily erased, particularly if a user is writing above or around previous writings, their hand will smudge or erase the prior text completely. Concurrent systems and designs have created smudge protectors, but those require the user to purchase and utilize an additional accessory limiting the ease of use. There is a need for a surface that can be erased but in the interim creates a semi-permanent ink that does not smudge or easily erase.

Also, concurrent erasable surfaces do not possess the ability to use graphics or permanently create backgrounds. Most educators and professionals use projectors to temporarily create light display images on erasable surfaces and then write over those images so as to teach or instruct their audience. Permanently placing such an image on a standard white board would be expensive due to the lack of maneuverability of a heavy board. It would also be expensive if the user decided to change the image or add other images. Concurrent systems and designs have created advanced ink printing systems that can screen graph or quickly place an image on any surface or other plastic composite materials. However, these materials do not also have the ability to then be written on once printed on, or if they do, the additional written ink is not erasable or is not erasable without damaging the background image. There is therefore a need for durable erasable surface that can hold permanent ink while allowing for semi-permanent ink on top of it.

Additionally, current erasable implementations are limited to uni-planar usage due to weight and mounting considerations. Most erasable surfaces that are attached or adhered to other instruments or items are only capable of being used on one side of the item. Thus, a dual sided assembly that increases user access and overall function is preferable.

Furthermore, often times, the inks that are utilized are toxic in nature and give off fumes, which can render the user nauseous and thus become almost unusable. And finally, concurrent erasable surfaces are inherently non-multifunctional. Current white boards are fairly standard and are found in square or rectangular shape and used solely as a linear board surface. Concurrent systems and designs normally feature adhering the boards to other surfaces such as desktops, but these designs all still only utilize the linear or planer dimension of the board. Thus, there is a need for erasable surfaces which can be manipulated and are capable of being implemented in diverse uses and maintaining structural integrity.

SUMMARY OF THE INVENTION

The instant apparatus and system, as illustrated herein, is clearly not anticipated, rendered obvious, or even present in any of the prior art mechanisms, either alone or in any combination thereof. The versatile system, method and series of apparatuses for creating and utilizing a series of systems and apparatuses comprising reinforced and substantially composite write erasable surfaces are illustrated. Thus the several embodiments of the instant apparatus are illustrated herein.

It is a primary object of the present multifunctional apparatus to introduce and utilize reusable, economical, environmentally friendly, long-lasting, multi-functional, write erasable surfaces. Thus, the surfaces created with the instant materials provide reusable, environmentally friendly, long-lasting, multi-functional, write erasable surfaces, which may also include an imbedded image or series of images while still retaining the write erasable capabilities.

It is a primary goal of the present system to provide multi-functional planning boards (and related products) that provide the user with erasable white board capabilities, peg board capabilities, tack board capabilities, sticky board capabilities, and storage capabilities simultaneously.

It is a primary goal of the present system to provide lightweight, inexpensive, double sided assemblies of multifunctional, polymeric erasable boards, that, when imprinted with an image, may appear as a picture, or logo while simultaneously concealing any important private writing or documents on the rear side, or even attached pockets or overlays, all of which may be stored on the reverse side of what appears to be a painting. An illusion, if you will. Thus, it is an object of the present system to provide an erasable, multi-functional, planning board, which simultaneously provides a great aesthetically and very pragmatic approach by allowing this light weight board to be flipped and act as a picture or graphic art rendition while concealing important private information and/or documents.

It is a primary goal of the present system to provide lightweight, erasable pegboards that utilize the inherent corrugations in the polymeric erasable boards as receivers of hanging devices. These polymeric erasable peg boards are easily installed, require no clearance, and utilize the surface entirely, including top and bottom edges, as there is no need for furring or strapping, unlike most current pegboards. An added benefit being that the user does not have to constantly look at all those unused holes, but may be able to look at his/her daughter, dog, company logo, or a picture of the sky or a landscape.

Along similar lines, it is a primary goal of the present system to provide a lightweight, more aesthetically pleasing, multi-functional, polymeric erasable bulletin board, or pin board, or tack board, as an alternative to current cork boards. A novel use of the recyclable plastic is to provide corkboard qualities in what may appear to be a picture or any graphic art rendition whatsoever. These boards also act as sticky boards, should the user desire to tape items to the surface.

It is a primary goal of the present system to provide a polymeric erasable surface to be utilized for the very novel idea of "faux erasing". Similar to faux painting, but accomplished by applying liberal amounts of marker ink within a permanent color in profile, and partially erasing (clouding) with tissues, cotton balls, cloth or any other means and the proper liquid solution. When complete, simply clean the surface entirely and re-use. This fun and artistic activity would be ideal for children, artists, anyone at all.

It is a primary purpose of the present system to utilize one or more overlays, or pockets, of smaller polymeric erasable boards permanently or temporarily affixed to one another. These overlays, or pockets provide additional strength, hanging capacity, storage for flat items, and may be a designated area to utilize as a tack or pin board area.

It is a primary goal of the present system to introduce numerous embodiments of structures, manufactures and items which allow erasable and layered printability. Also, a primary goal of the present system is to provide a lightweight, inexpensive, two-sided assemblies of polymeric erasable boards that may be used as a writing or drawing surface.

It is yet another object of the present system to provide assemblies of polymeric erasable boards that may be digitally imprinted on one or two sides with a personalized image or logo and yet another object of the present system to provide assemblies of polymeric erasable boards that can receive writing that does not come off easily when brushed against, yet may be cleaned using water only and do not shadow.

It is yet another object of the present system to provide assemblies of polymeric erasable boards that are durable and have strong structure in all facets. Additionally, it is yet another object of the present system to provide assemblies of polymeric erasable boards that can be used in varied markets because of their numerous structures and ease of use and it is yet another object of the present system to provide assemblies of polymeric erasable boards that may be manufactured from recycled plastic and are 100% recyclable themselves.

It is yet another object of the present system to provide assemblies of polymeric erasable boards that through pinning, riveting and/or welding allows for framing and various constructions of the polymeric erasable surfaces. It is yet another object of the present invention to provide assemblies of polymeric erasable boards that features a hinge, by compressing a thin strip of a corrugated plastic sheet or by severing halfway through the corrugated plastic sheet.

Briefly stated, the present system contemplates assemblies of polymeric, or composite, erasable boards having writable and erasable surfaces featuring a front panel and a rear panel, wherein the panels are interconnected substantially perpendicular rows, or corrugations. The assembly of polymeric erasable boards of the present invention can be adapted to be used as a white board, tack board, sticky board, container, display, frames, notebooks, children's toys, books, pegboards, lap tables, easels, signage, storage organizations, and writable wall coverings and other numerous entities.

The configuration of the present system provides the user with a more functional polymeric erasable surface throughout their home, business, or school. The material is multi-colored, foldable, stackable, recyclable, storable, mobile, compatible, reusable, inexpensive, able to be personalized, efficient, erasable, easily installed, light weight, capable of having any shape. It is also water resistant, may include pockets for storage, and/or protective edges.

It is yet another object of the present system to incorporate construction methods including gluing, banding, tying, ring binding, pegging, VELCRO® hook-and-loop fasteners pinning, four pronged, multi-planar pinning and multipronged, linear pinning.

The instant system of creating write erasable structures utilizable by people of all age groups, from drawing board and room restoration to dog house and doll house embodiments. Thus it is an objective of the present system to provide lightweight, portably disposed whiteboards, pegboards, tack boards, binders, notebooks, multipurpose picture frames, writable erasable storage tools, writable erasable walls, boxes, rooms and structures in the entirety.

Thus it is an objective of the present system to create toys such as internally disposed series of dolls, writable surfaces for toys like LEGO® building-block-type systems and storage systems that avow children to build, play within, write on, and deconstruct the systems.

In more adult applications, hangers for coats, room signs and multifunctional, write erasable tool boards, kitchen boards, classroom boards and the like are envisioned. The positive features of the write erasable tool placement board, including aesthetics, as you don't have to look at all those unused holes, which also doubles as a multifunctional pegboard, are particularly inherent as craftsmen often add tools to their arsenal. Thus, the instant system affords the user the capability to quickly and easily rearrange a tool board by erasing the current tool markings, removing the pegs and then drawing the new tool markings and positioning the pegs accordingly.

It is additionally an objective of the present system to utilize a Glycol ether or other like system to remove pen, permanent markers, and other permanent writable means. This allows the user the option of using water washable markers that clean using water only yet writing does not come off easily when brushed against. The user may use dry erase type markers that clean using a simple soap solution, yet writing does not come off in the rain or when wet, and does not come off when brushed against or handled. The user may use pen that may be cleaned using alcohol or glycol ether, yet writing does not come off in the rain or when wet, and does not come off when brushed against or handled. Lastly, the user may use a permanent type marker that may be cleaned using glycol ether and water, yet writing does not come off in the rain or when wet and does not come off when brushed against or handled.

It is additionally an objective of the present system to introduce specialized pegs with pressurized materials. These pegs may be used as hanging devices similar to current peg board hanging devices, though the inserted leg or legs protrude downward (as opposed to upward as with current peg board hanging devices) into the open corrugations and do not require protruding completely through the surface. These pegs may also be used to connect the polymeric erasable boards to one another.

It is additionally an objective of the present system to introduce a multifunctional, totally enclosed cabinet, designed to appear as a picture, painting, or any graphic rendition whatsoever. The multifunctional cabinet that appears as a picture simultaneously provides artwork display capabilities, hidden peg board capabilities, hidden white board capabilities, and hidden storage capabilities in what appears to be a picture, painting or any graphic rendition. Furthermore, the multifunctional cabinet that appears as a picture allows the user the opportunity to install and utilize this multifunctional organizational device in any area whatsoever, where a user may not normally do. For example, it would not be likely that one would find, nor necessarily desire as a constant, a whiteboard in an individual's living room, den, or dining room. Also, pegboard surfaces are usually found in the garage or cellar of a person's home, not in an office or dining room. Because these surfaces tend to not be aesthetically pleasing, they remain in areas hidden away. Consequently, the multifunctional cabinet that appears as a picture allows the user the ability to have these surfaces and other capabilities in any setting whatsoever because the device appears as a picture and not a work surface, thus enhancing any room.

Finally, assuming they already have a picture in their living room or office, the multifunctional cabinet that appears as a picture may be made to appear as that exact picture. With the progression of modern technology and more specifically, cell phones with the capability to take high quality photographs, the user could simply take a picture of the picture in their living room or office and have that exact picture imprinted on the cabinet.

Pictures, paintings, signage, or any graphic or artistic renderings or images are common and found as decorations around the world. They have many uses. Most often, pictures, paintings, etc. are found mounted in some sort of frame. The frame may or may not give depth to the rendering. The artistic rendering's value may be decorative, sentimental, inspirational, or informative. They may be an advertisement. They may even need to be displayed because of the law, such as a legal notice. They may also be used to fill up empty wall space. Lastly, they may provide a combination of all these qualities.

The rear surface of the picture or artistic rendering is seldom, if ever, used. Also, the space between the rear surface of the picture or artistic rendering and the actual wall surface is also not currently used. The multifunctional cabinet that appears as a picture, as well as other embodiments described herein, utilizes this unused, or wasted wall space for hidden storage of commonly used items, important documents, private thoughts, information, and/or writing.

This embodiment may be considered, at least from an exterior visual perspective, very similar to the idea of canvas art that is very prevalent today. Canvas art is the process of taking a canvas, or other like material, and imprinting a permanent image on the material. The canvas is then applied over a simple wooden frame. The entire surface, including edges, may be imprinted, giving this type of art work display depth. However, again, the rear surface of the artwork display, as well as the space behind the picture and between the frame and the picture is not utilized.

The multifunctional cabinet that appears as a picture utilizes this depth and space. Therefore, the cabinet may also be viewed as a three dimensional, permanently imprinted artistic rendering that; when open: 1) reveals the back of the imprinted cover that may be used as a white board, 2) reveals the back of the device that may be used for a white board or a peg board, 3) reveals two or more write erasable storage boxes that also may be used as a white board or peg board type surface, 4) reveals one ore more pockets or overlays for increased functionality, efficient storage of flat items and increased hanging capacity. When closed, the multifunctional cabinet will appear only as a picture.

To encompass the uniqueness of the multifunctional cabinet that appears as a picture, for example, when a person walks into a room and in the room there are three pictures, or more accurately, three structures that appear as pictures. The person would most likely not know that the picture is anything other than a standard picture, the rear surface of the front cover is a handy white board when opened, or that behind the imprinted rendering (cover) and inside the structure that appears as a standard picture, is a hidden, write erasable board, two or more write erasable peg board storage boxes, and a write erasable vertical peg board surface for use with easily removable hanging devices. Also, the person would not know that subject to the user's choice, even the outside of the device may be used as a peg board type surface.

The multifunctional cabinet that appears as a picture sums up the entirety of the write erasable component system and its objective of better and more efficient use of wall space in an aesthetically pleasing manner. Wall space, in this case, just to name a few may also include surfaces such as glass windows, doors, the sides of a metal filing cabinet, both sides of an upright office partition or cubicle space, a fence or an exterior wall. It is also the intent of this system to provide walls that allow the user the opportunity to simultaneously organize commonly used items, important thoughts, notes and paper documents on the inside of what appears to be a picture.

The following example will expand on the potential legal benefits of the multifunctional cabinet that appears as a picture: the law currently requires businesses, or companies to post right to know type notices in their places of business. Most often this is accomplished by installing an imprinted sign, or placard, or even just a piece of paper attached to a wall. Usually, a company would have these necessary legal requirements posted in one designated area. Often times a break room is utilized for this purpose. Examples of these notices are OSHA safety and labor laws, minimum wage requirements, equal opportunity laws, no smoking, or employees must wash hands prior to returning to work signs. Furthermore, material safety data sheets, hazardous material documents, safety manuals, and other written information, may be required to be stored and available in the same area.

The multifunctional cabinet that appears as a picture allows the company to simultaneously: 1) have these notices imprinted on the exterior of the cabinet so as to meet legal requirements; 2) provide a space for storage of additional required paperwork; 3) provide additional storage and hanging capacity for safety related items; and, 4) provide a surface to erasably record work hours, to do lists, meeting schedules, etc.

In another example, the multifunctional cabinet that appears as a picture would be very useful in the health care industry and medical profession. In particular, nursing homes and hospital rooms that tend to be very small with very little floor space. In this case, the multifunctional cabinet that appears as a picture will allow the nursing home or hospital the opportunity to create more much needed space in an organized, efficient and aesthetically pleasing manner by utilizing any blank or unused walls. Anywhere there is an open wall, a multi functional cabinet that appears as a picture may be installed, along with all of its benefits. Nursing homes in particular as the occupant of the room is usually there for an extended period of time, making the room more of a home. Of course, this better use of wall space would be of utility in many other living spaces such as apartments or condominiums that have no basement or garage for commonly used maintenance items, basic tools, or any necessary items at all.

The cabinet enables the occupant or nursing home/owner to remove many small items off of floors, crowded counters, bed stands, tray tables, etc. Not only does the cabinet allow for space on the inside of the device, but the entire exterior, and especially the bottom or underneath of the cabinet, may be used as a three dimensional peg board type surface for insertion of hanging devices into a multitude of open corrugations that are made available by the design of the box portion of the cabinet. Anywhere there is an open corrugation, hanging devices may be inserted to hang any item whatsoever. This allows for better use of the wall space beneath the cabinet as well, especially as a place to hang coats, hats, pocketbooks or any items that would be hung on standard coat rack/hanging products found currently.

The cabinets may even be designed such that a portion of the exterior would be left unprinted, giving the user the ability to changeably record the contents of the cabinets on the front side. For instance, the nursing homes logo may be permanently imprinted on the front of the front cover, leaving the surface area around the logo to be utilized as a write erasable surface for either organizational purposes or just as another handy white board type area to let the patients know of activities or to remind them that a particular sporting event or show that they like is on television at a certain time. It may even be a great spot for a family member to use to leave inspirational or reminder type notes for the occupants.

Finally, the nursing home may decide to utilize the front of the cabinet for a write erasable monthly menu. In this case the nursing home will have the ability to utilize a permanent type marker for the grid to be utilized for the monthly menu. In this case the value of the use of glycol ether erasable coating cannot be over emphasized. Foremost, this glycol ether erasable coating allows the user the benefit of knowing that the permanent type writing will not come off unless the user desires so. The writing also will not come off or smudge even when wet, yet still can be removed at anytime. This coating works equally well on "Sharpie" type permanent markers and standard pen inks. An added benefit of the glycol ether erasable coating is that it allows the user the option of designing their own grids, to do lists, calendars, etc. These so called "permanent" type markings may then be used in conjunction with other markers. Therefore, the user could then utilize either water washable markers or "Expo" type dry erase markers that would be cleaned with other solutions, yet not remove the permanent type markings.

This system of using permanent type markers in conjunction with semi permanent type markers works with all embodiments described herein and would be ideal for use by children. For example, any color in profile could be written in permanent type markers by a parent or adult supervisor. The child could then use water washable type markers to color inside the profiles and when done simply use water to erase the coloring, leaving only the permanent profile provided by the permanent type marker. When the child is tired of the permanent type color in profile, or desires a different one, it could simply be erased or re-done in a different manner. Of course, when erasing, the child could also utilize the idea of "faux erasing" as described previously. This idea would work equally well with adult usage, eliminating the need to tape grids as is commonly done on many standard erasable surfaces in use currently. This capability not only eliminates the need for the taping of grids, but also makes it much easier to change the grid.

Another benefit of the glycol erasable coating is that the user may utilize a standard pen or fine point permanent type marker, allowing the user to write smaller and clearer when needed. This also allows more writing in a smaller space, which may be necessary in many circumstances.

An additional benefit of this embodiment, as well as all other embodiments described herein, is that the polymeric erasable board that comprises the multifunctional cabinet that appears as a picture is not only very light weight, strong, durable, and multifunctional, but also that it is completely moisture resistant, and very easy to clean. Should it be necessary, the device could easily be removed from the wall and washed and disinfected thoroughly as the device is impervious to water.

Another benefit of the multi functional cabinet that appears as a picture is that this cabinet may be made to any size, or depth, by changing the distance between the back slits. This allows for customization by the user to fit particular needs. For example, the cabinet may be manufactured to approximately one to three inches in depth for hidden organization of such items as keys, wallets, cash, spare change, cell phones and accessories, eyeglasses, writing utensils, and paperwork such as bills, checks, etc. One ideal place for a cabinet of this size would be in an entryway to a home or a kitchen where people tend to come in and empty their pockets upon arriving home, usually on the nearest countertop or table. In a bedroom the cabinet would be particularly ideal for earrings and all types of jewelry. As the cabinet is completely moisture resistant and able to be disinfected, the cabinet would be ideal in any commercial or residential bathroom to create more hidden type storage space for medicines, personal hygiene products, etc., as well as supplying a multitude of other functions.

In an office, the cabinet would be ideal for smaller items that are used daily in an office setting such as scissors, tapes, staplers/staples, paper clips, stamps, computer accessories, pens, pencils, and paperwork, to name just a few. In practice, the cabinet could be installed directly behind or in the vicinity of the user's desk, making it unnecessary to shuffle through drawers for these commonly used items.

Again, not only does the user have the opportunity to keep these items in an organized, easily accessible fashion, but also the device can always be used as a hidden write erasable board, calendar, or for simple notes and reminders. The value of the "hiddenness" of the white board can be seen in the idea that most business information is not necessarily meant to be viewed by "just anyone" entering the office. Customer names, important notes, current projects, important strategies or future goals may be kept private by simply closing the cover. Consequently, should the user have clients in for a meeting, the board could be closed to hide private thoughts, information, documents, and any items stored behind or inside a cabinet, while simultaneously appearing as a picture of the users family, a company logo, an inspirational saying, a landscape, or even the users college degree.

Another benefit of the smaller cabinets is that they are actually closer to the size of a standard picture and frame or canvas type art, thus furthering the illusion. The cabinet, when made in larger sizes, or with more depth, would be ideal when the user needs larger storage and hanging capabilities in areas such as a garage, basement, work shop, laundry room, or closet. The cabinet could be constructed from approximately four to ten inches in depth for this purpose. When constructed with more depth, the top of the cabinet will also act as a sturdy shelf, eliminating the need for an actual shelf.

For example, the multifunctional cabinet that appears as a picture would be particularly useful in a closet or laundry area where people need shelf space, storage, and hanging capacity. Items could be organized and stored on the interior of the cabinet, while simultaneously using the top portion for a shelf. The open corrugations on the bottom or underneath of the structure could be used to hang clothing. The contents then could be erasably written on the exterior of the cabinet for identification purposes.

The multi functional cabinet that appears as a picture may also be custom made to match a room. For instance, the user may want the sides of the cabinet to match an existing wallpaper border in the room. Or the user may want to match the woodwork on a cherry cabinet or the oak trim in an office. The user may accomplish this by taking a photograph (usually a close up) of the desired surface and permanently imprinting it on the desired surface of the cabinet. Therefore, the cabinet may appear as a family portrait with an oak trim to match the oak trim in the room, merely by proper design.

The foregoing has outlined the more pertinent and important features of the present invention in order that the detailed description of the invention that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

There has thus been outlined, rather broadly, the more important features of the versatile integrated write erasable board, functional peg board, and series of accompanying systems and apparatuses and embodiments in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

Advantages of the present invention will be apparent from the following brief description of exemplary embodiments thereof, which description should be considered in conjunction with the accompanying drawings. Having thus described the invention in general terms, reference will now be made to the accompanying drawings, which are not necessarily drawn to scale, and wherein:

FIG. 1A illustrates an embodiment of the present invention, more specifically it illustrates the back, or decorated side of the polymeric erasable surface, which also may be erasably written on, including holes at the top and the bottom to reversibly fasten the assembly to a support surface and wherein there is also no requirement for holes as a user can pin right into the facing areas additionally as illustrated in the Figures below.

FIG. 1B illustrates the embodiment of the present invention shown in FIG. 1A, and more specifically it illustrates the front side of the polymeric erasable surface, including holes at the top and the bottom to reversibly fasten the assembly to a support surface and wherein there is also no requirement for holes as a user can pin right into the facing areas additionally as illustrated in the Figures below.

FIG. 2A illustrates a side view of the embodiment of the present invention shown in FIG. 1A, highlighting the front and rear polymeric sheets connected by corrugations.

FIG. 2B illustrates the alternate side view of the embodiment of the present invention shown in FIG. 1A, highlighting the front and rear polymeric sheets connected by corrugations.

FIG. 3 illustrates a frontal view of an embodiment of the present invention namely, a notebook cover, with a hinge across the center to allow the notebook to be formed by folding over the hinge.

FIG. 4 illustrates a top view of the notebook of FIG. 3 in its folded form.

FIG. 27 illustrates an additional a variety of the different affixing or hanging elements including cotter styled pins which include extended prong, chisel point and hammerlock styles, among others.

FIG. 29 illustrates a lightweight multipurpose, corrugated paint assistance mechanism which may be utilized in tandem with a brush or a roller.

FIG. 30 illustrates a glycol ether erasable coating or any other genre of coating which may be utilized to enhance erase ability on the note book, or any of the instantly presented systems.

FIG. 31 illustrates a multipurpose notebook mechanism or binder mechanism embodiment and also illustrates a securing flap and a button, latch or other securing mechanism, utilized to lock the notebook or binder.

FIGS. 32A, 32B and 33C illustrates the corrugated notebook device and more specifically illustrates the device in its open form, closed form, and open form in use as a self-standing display array.

FIGS. 33A, 33B and 33C illustrates the lightweight, write erasable, re-usable, durable, foldable project display board in open form and as a self-standing display array.

FIGS. 34A, 34B and 34C illustrates the multi-functional, combination polymeric erasable white board, peg board, tack board, sticky board, and open storage box from a top view, a front view and a three dimensional view.

FIG. 37 illustrates a front view of the multifunctional cabinet in a fully unassembled state.

FIG. 38 illustrates a rear view of the multifunctional cabinet in a fully unassembled state.

FIG. 42 illustrates the multifunctional cabinet in its open position utilizing the pocket overlay, in use with a hanging device.

FIG. 49 illustrates an exploded view of the solid interlock partition member.

FIG. 50 illustrates an isometric view of the perforated (or solid) decorative trim and protruding pins which secure the trim to the polymeric erasable boards. The perforated, decorative trim allows for the use of different hanging devices to be utilized through the perforations.

FIG. 51 illustrates a single pronged hanging device that may be utilized in conjunction with many of the apparatuses described herein.

FIG. 52 illustrates the single pronged hanging device of FIG. 51 utilized within an apparatus.

FIG. 53 illustrates a three pronged hanging device utilized within an apparatus.

FIG. 54 illustrates a two pronged mirror image hanging device utilized within an apparatus.

DETAILED DESCRIPTION OF THE INVENTION

Figure 5:
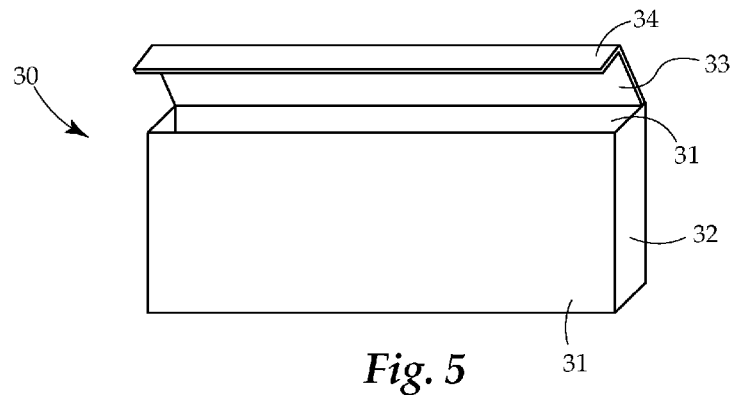
FIG. 5 illustrates a top view of an embodiment of the present invention, namely a box or envelope formed of the corrugated plastic sheets and suitable for use as a container or mailbox.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Turning now descriptively to the drawings, FIG. 1A illustrates a standard sheet of the polymeric erasable assembly 10 in use with an example of permanent imaging or design 14 on the front surface 11. FIG. 1B illustrates the rear surface 12 of the polymeric sheet. The composition of the polymeric erasable assembly 10 is better depicted in FIG. 2A. Comprising of a front panel 11 a rear panel 12 wherein the panels are interconnected parallel rows, or corrugations 13.

This product can come in many embodiments, one such system is a notebook 20 shown in FIG. 3. The notebook is composed of two sheets 21, 22 of the polymeric erasable panels and is connected using a hinge of the same material 23. FIG. 4 illustrates this embodiment in closed form with the front surface of the panel 21 facing up. These notebooks can be used for business or educational use with the natural lines from the corrugations forming a means to guide text. These notebooks can also be permanently printed on with grids, lines, or drawings via personalization by the user. The polymeric erasable surface allows reuse so that these eco-friendly notebooks can reduce the demand for paper products.

Another embodiment of this invention is a box, envelope or otherwise container 30 as seen in FIG. 5. This box is solidly formed by folding and bonding one piece of the corrugated plastic sheet 31 so as to form a U-shape. The box 30 can also be formed by attaching separate pieces to form the front, back, and bottom using internal pins, rivets, and beams (70, 71, 72, 73 as seen in FIG. 11-14) that can maintain the outside aesthetic while giving the user a sturdy item. The building method used will demand on the user's requirements and dimensions of the box. The box 30 can also feature side pieces 32 adhered by bonding through melting the plastic together or the internal clip method. The box 30 can be left open on top or can be made to close by adhering a lid 33 that can feature a lip 34 which can be made by folding 33 or by adhering a new piece.

Figure 6:
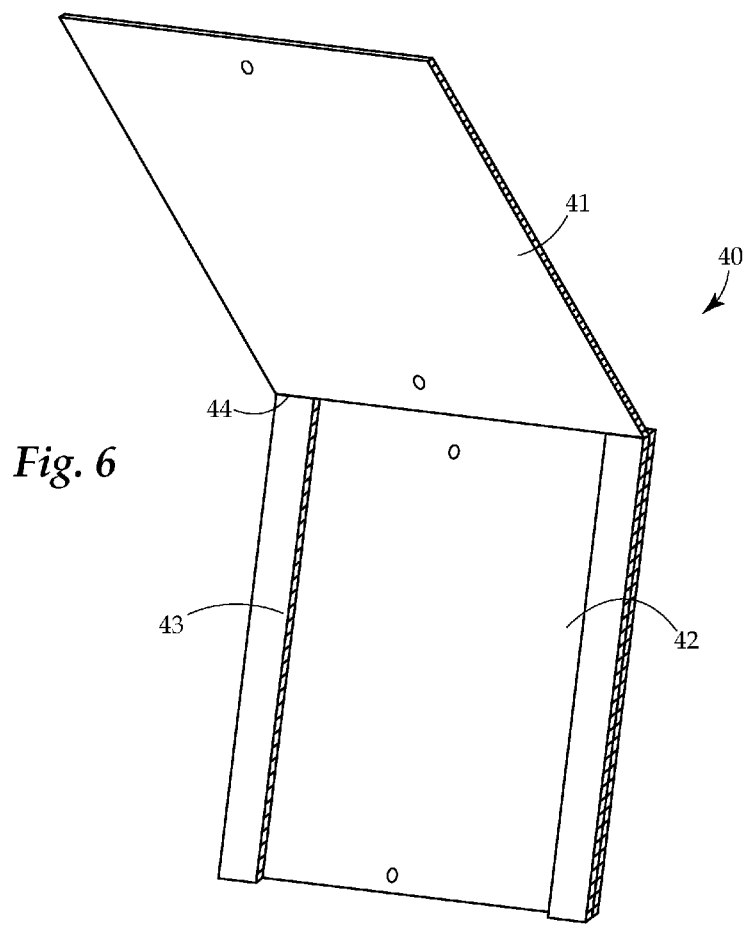
FIG. 6 illustrates a frontal view of an embodiment of the present invention, namely a special form of notebook which features a double corrugated plastic rail or overlay, allowing the notebook to have depth creating a container.

Another embodiment of this invention is a three dimensional notebook 40 as seen in FIG. 6. The notebook is composed of two sheets 41, 42 of the polymeric erasable panels and is connected using a hinge of the same material 44. An additional strip 43 is adhered to both sides of the rear panel 42 in order to create a hollow bed that when the notebook is closed is capable of holding supplies.

Figure 7:
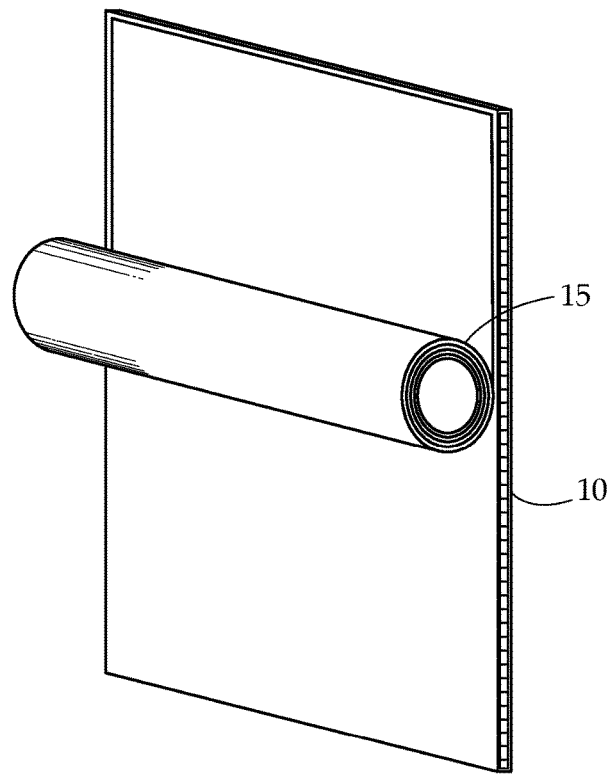
FIG. 7 illustrates a frontal view of an embodiment of the present invention, namely a laminate screen adhered to the polymeric erasable surfaces for increased functionality.
Figure 17:
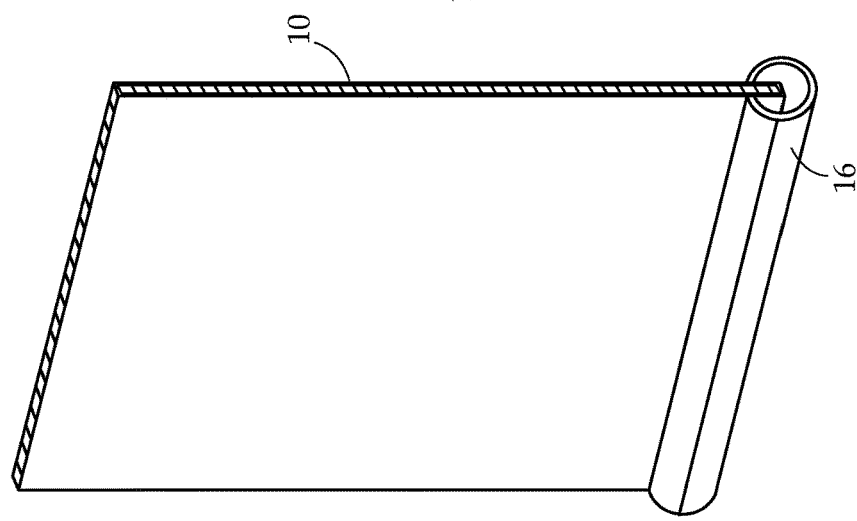
FIG. 17 illustrates a frontal view of finishing edges that can be used in any of the embodiments of the present invention.

The present invention can also be made with accessories that increase the ease of use and functionality of the polymeric erasable surfaces. In FIG. 7 a laminate sheet 15 is shown being placed over a standard polymeric erasable sheet 10. This laminate 15 better protects the surface and can also be written on if a user wants to further layer their creations. Another accessory is seen in FIG. 17. A finishing strip 16 can be adhered to the edge of any standard polymeric erasable sheet 10 and allows for further protection for the user from sharp edges and is aesthetically pleasing for users seeking to display their product.

Figure 8:
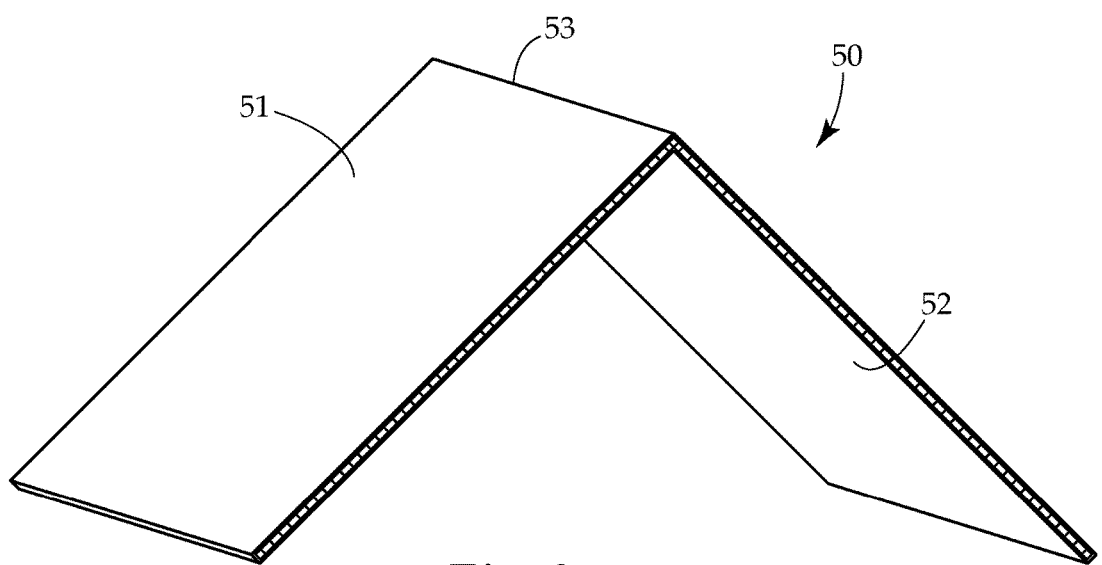
FIG. 8 illustrates a frontal view of an embodiment of the present invention, namely a freestanding sign wherein the corrugated polymeric or plastic sheets can be bent to form an A-frame.

Another embodiment of this invention is an a-frame display 50 as seen in FIG. 8. This a-frame 50 can be used commercially as a sign for curb or window display but can also be used for student projects, classroom, easels, children's play toys, etc. The display 50 is formed by two panels 51, 52 that are attached using a hinge 53 similarly to the notebook design. The display can also be reinforced with internal pins, rivets, or beams (70, 71, 72, 73 as seen in FIG. 11-14) to ensure that the structure is supported. The use of external screws is also possible.

Figure 9:
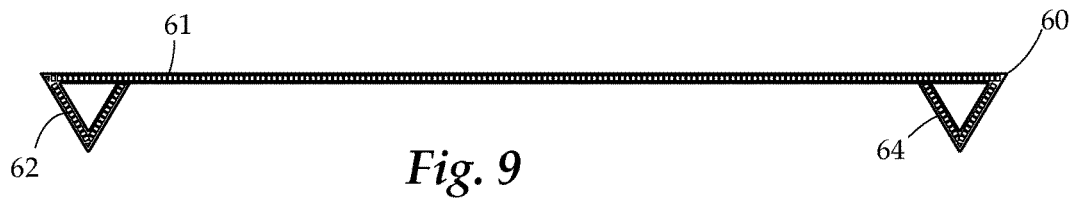
FIG. 9 illustrates an end view of an embodiment of the present invention, namely a lap table or shelf where a corrugated plastic sheet is folded and bonded.
Figure 10:
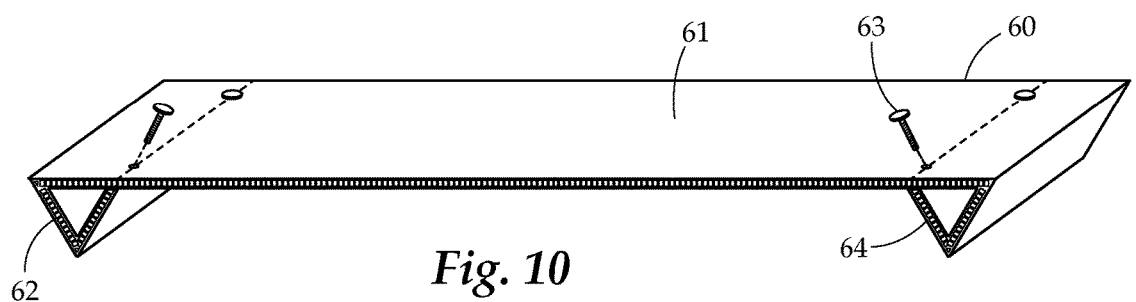
FIG. 10 illustrates a top view of an embodiment of the present invention, namely the lab table shown in FIG. 9.
Figure 11:
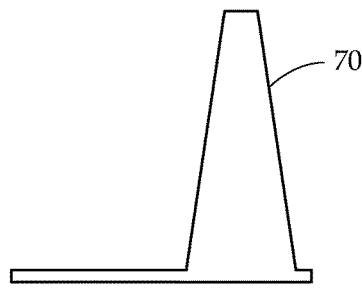
FIG. 11 illustrates an elevation view of a pin or rivet used to connect various pieces of the corrugated plastic sheet used in the embodiments of the present invention.
Figure 12:
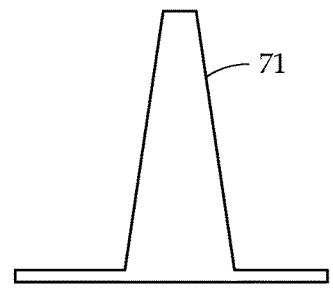
FIG. 12 illustrates an elevation view of a pin or rivet used to connect various pieces of the corrugated plastic sheet used in the embodiments of the present invention.
Figure 13:
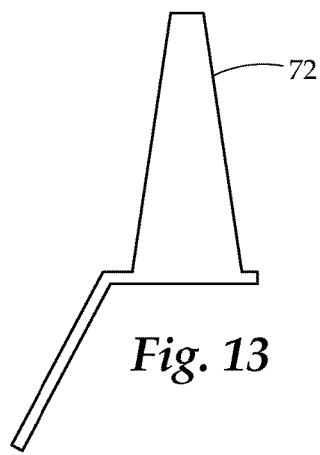
FIG. 13 illustrates an elevation view of a pin or rivet used to connect various pieces of the corrugated plastic sheet used in the embodiments of the present invention.
Figure 14:
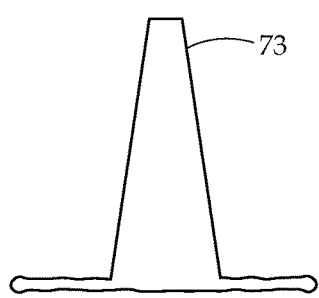
FIG. 14 illustrates an elevation view of a pin or rivet used to connect various pieces of the corrugated plastic sheet used in the embodiments of the present invention.

A further embodiment of this invention is a lap table or other small shelf 60 as seen in FIG. 9 and FIG. 10. The lap desk 60 is composed of a top panel 61 and two legs 62, 64. These legs can be made by folding the top panel 60 twice thus forming an under mounted triangle or can be formed by adhering additional piece to the top panel. The legs are secured in place to ensure a properly supported structure by the use of screws 63.

Figure 25:
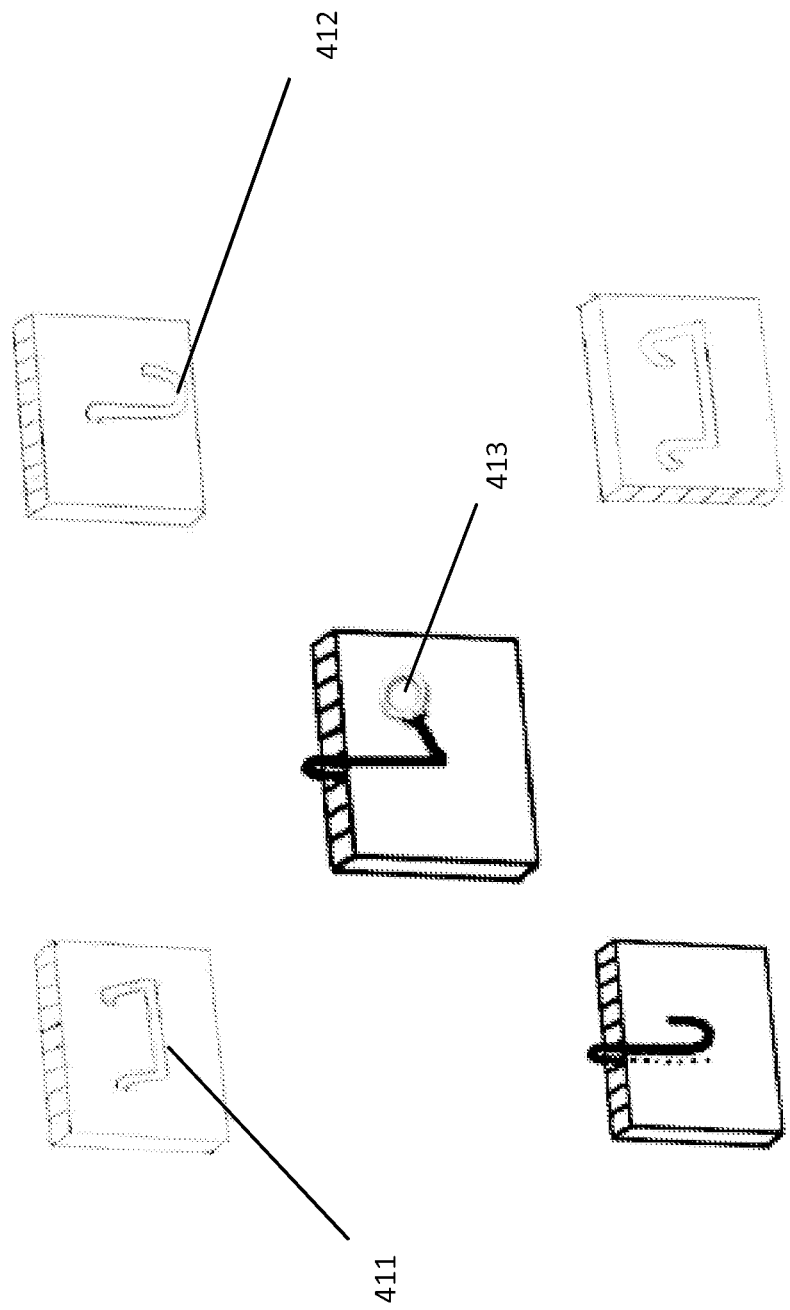
FIG. 25 illustrates a variety of the different affixing or hanging elements which may be utilized with the individual elements of the write erasable, corrugated system.

An additional embodiment of the instant system illustrates a system designed for the interior of vehicles and disposed to utilize VELCRO® hook-and-loop fasteners, or other such positioning systems splayed across a dash board. Also, mechanisms to receive screen projections, are introduced and these may utilize a U-shaped mechanism 411 or a L-shaped mechanism 412 as illustrated in FIG. 25 in order to support objects such as a coffee cup holder.

Also, as illustrated in FIG. 29, in one embodiment, an extremely light weight painting assistance mechanism 430 that affords the user the ability to paint shelves and walls and tight areas and not have to tape off or cut in areas as the instant system can easily be held in place.

Additionally, the instant system may comprise an embodiment wherein extremely lightweight, maneuverable, writable erasable boards for classrooms usage, which also double as mechanisms to receive screen projections, are introduced.

Figure 23:
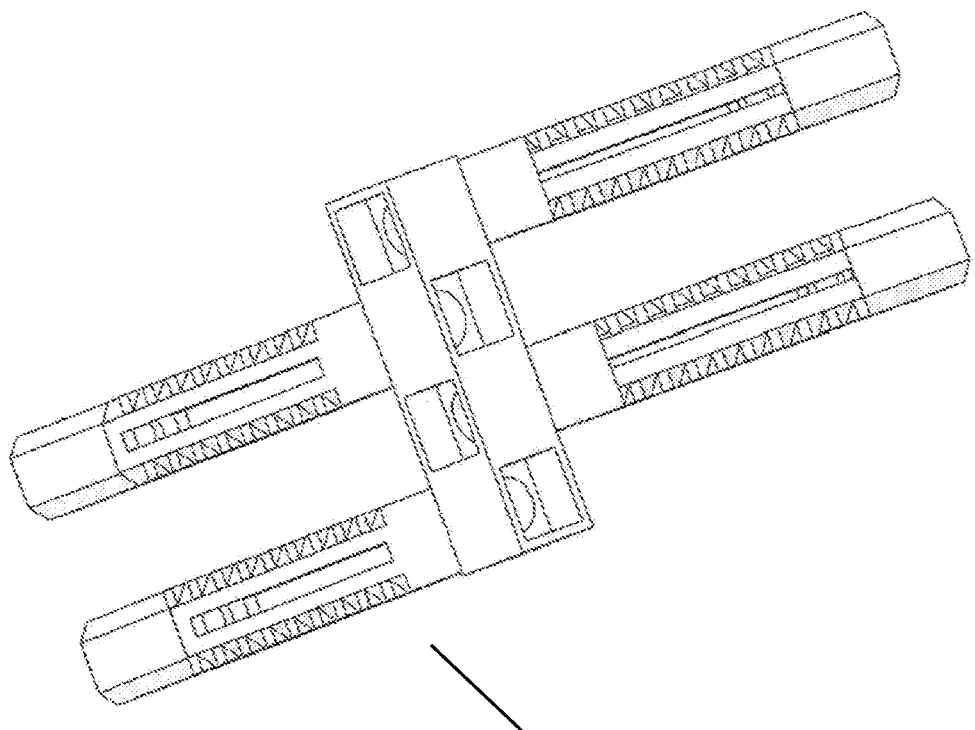
FIG. 23 illustrates a front isometric view of a multi-pronged pin apparatus which is utilized to join individual elements of the write erasable, corrugated system wherein the double pin configuration eliminates rotation on the corners.
Figure 24:
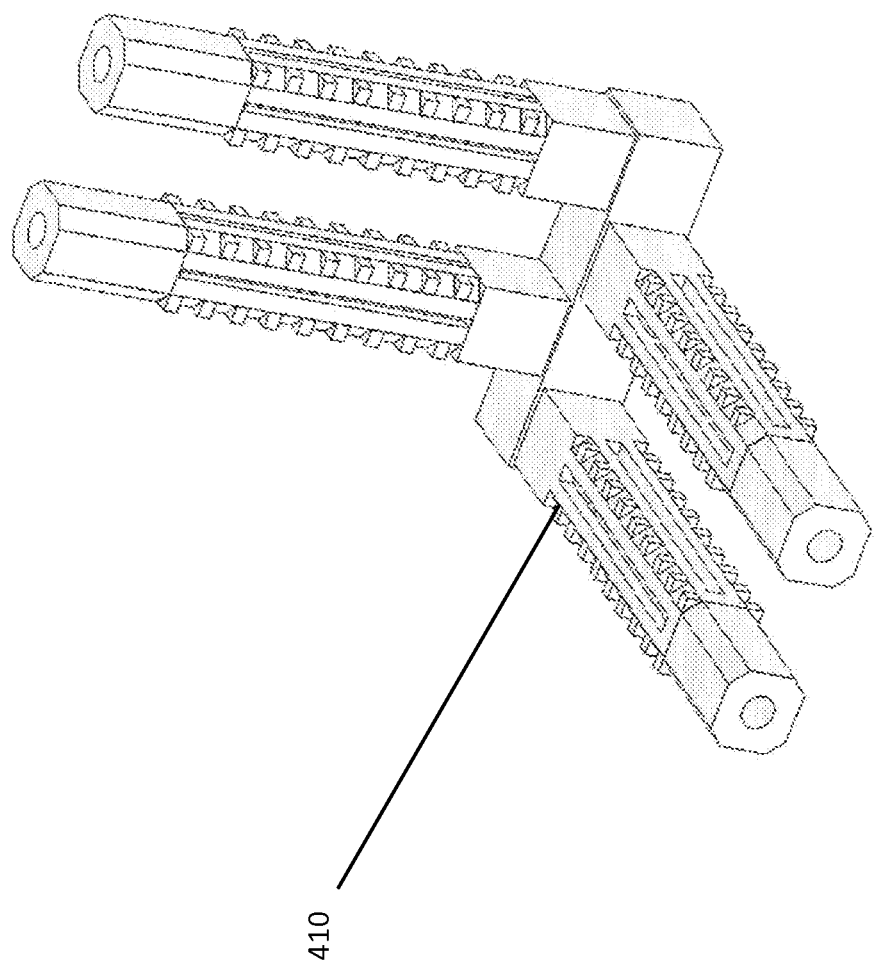
FIG. 24 illustrates a rear isometric view of a multipronged pin apparatus which is utilized to join individual elements of the write erasable, corrugated system.

FIG. 23 illustrates a front isometric view of a multi-pronged pin apparatus 410 which is utilized to join individual elements of the write erasable, corrugated system wherein the double pin configuration eliminates rotation on corners. The pin may include two prongs, four prongs or as many even or odd pronged iterations as necessary. Additionally, connecting pins can be configured at any angle whatsoever including but not limited to 30 degree, 45 degree, 90 degree, 120 degree . . . etc., as the situation demands.

An additional feature of the smaller boards as well as the notebooks and binders is that they have the benefit of being "better in the wind" or while holding upright, unlike paper. Furthermore, the instant notebook 450 affords the user a sturdy place to write on paper with. For example, the utility can be seen in situations like signing a check in your car at the drive thru of your bank or for contractors taking notes at a site. The instant system is great with a standard pen . . . they write beautifully, have inherent lines, don't flop around, are erasable, mobile and reusable, can get wet without losing information, and provide a sound surface for writing on paper. Also, the foldable whiteboards and notebooks inherently allow for storage within the multiple folds.

Further, as illustrated in FIG. 31, the instant notebook embodiment a securing flap 451 to ensure closure and integrity of the corrugated notebook may be realized. Further, a button, latch or other securing mechanism, here shown as a VELCRO® 424 hook-and-loop fasteners system, may be utilized to lock the notebook or binder 451. Further, as illustrated in FIG. 30, a glycol ether erasable coating 440 or any other kind of coating may be utilized to enhance erase ability on the note book, or any of the instantly presented systems.

Along the line of more novelty or gimmick items, a write erasable pet carrier which is easily cleanable and extremely light and sturdy, a cut out dress holder in shape of a dress comprising pegs/pins to hang accessories and jewelry, and a myriad of children's toys.

In order to adhere the polymeric erasable sheets to one another and ensure strong structure in various embodiments, the corrugations of the sheets allows for the use of pins 418 (as seen in FIG. 27). These pins may be metal, plastic, or any material whatsoever, allowing one leg to insert into the corrugated panel of one sheet and the second leg to insert into a second corrugated panel, thus connecting the panels.

Also, these pins in the present invention may form an L-shape or U-shape 412, 411 (as seen in FIG. 25), allowing one or more legs to be inserted into the corrugated panel to be utilized as hanging devices. These pins may comprise as many legs as necessary and comprise any shape whatsoever. These pins would be used in a similar fashion to current pegboard accessories/hanging devices, but do not need to protrude completely through the corrugated sheet, thus eliminating the need for furring or strapping.

Figure 15:
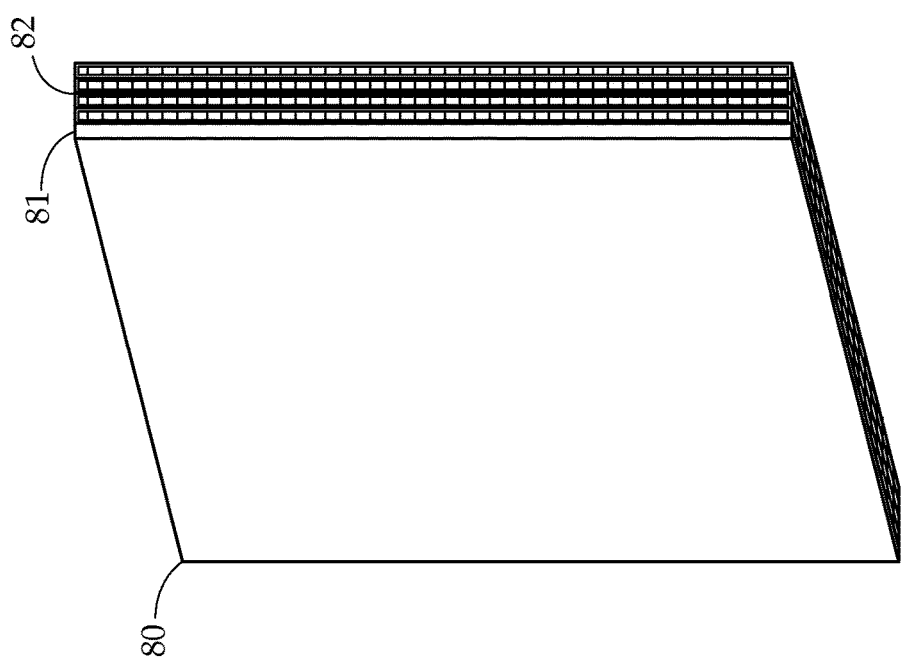
FIG. 15 illustrates a frontal view of an embodiment of the present invention, namely a stack of the corrugated plastic sheet. The sheets can be bonded to one another completely in order to form a more rigid structure. Alternatively, the sheets can be bonded to a hinge at one edge to form a book of sheets.

Another embodiment of this invention is a bound stack of sheets 80 as seen in FIG. 15. A stack of sheets 80 may be dimensionally desirable for user seeking to use the surface as a table or other standing structure. The stack can consist of adhered panels 81, 82 that combined create any size block that the user desires.

Figure 16:
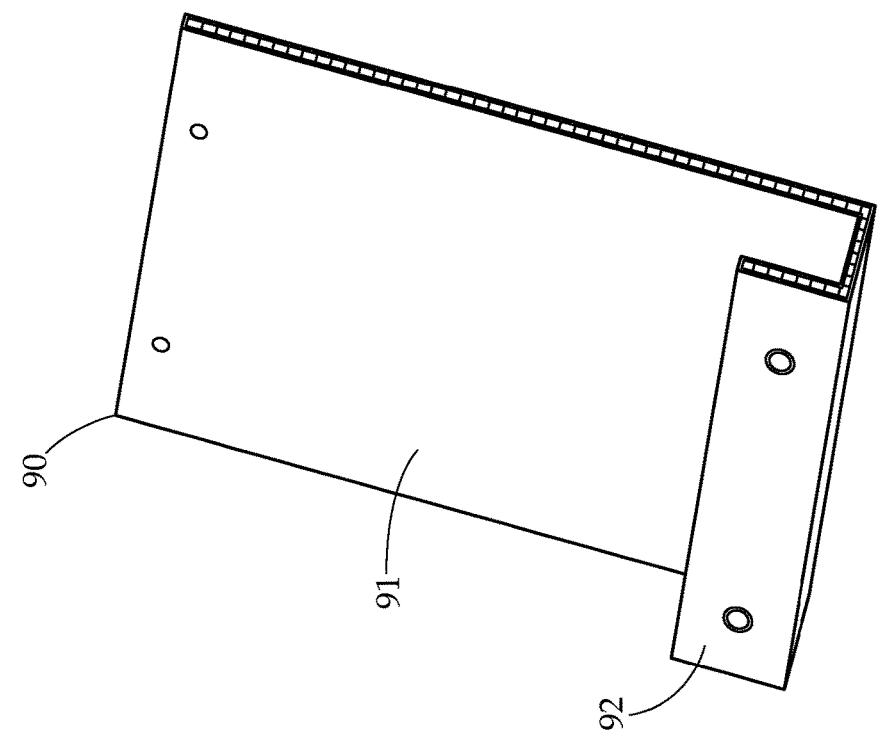
FIG. 16 illustrates a frontal view of an embodiment of the present invention, namely a board with a tray, where a corrugated plastic sheet is folded and bonded twice.

Another embodiment of this invention is a board with a tray 90 as seen in FIG. 16. A sheet 91 can be folded twice to form a bed with a lip 92. These folds can be reinforced by bonding. The tray 92 can also be formed by adhering additional pieces adhered by using internal pins, rivets, or beams (70, 71, 72, 73 as seen in FIG. 11-14). The tray function would allow users to store markers and washing fluid near the board or to hold any additional supplies desired.

Figure 18:
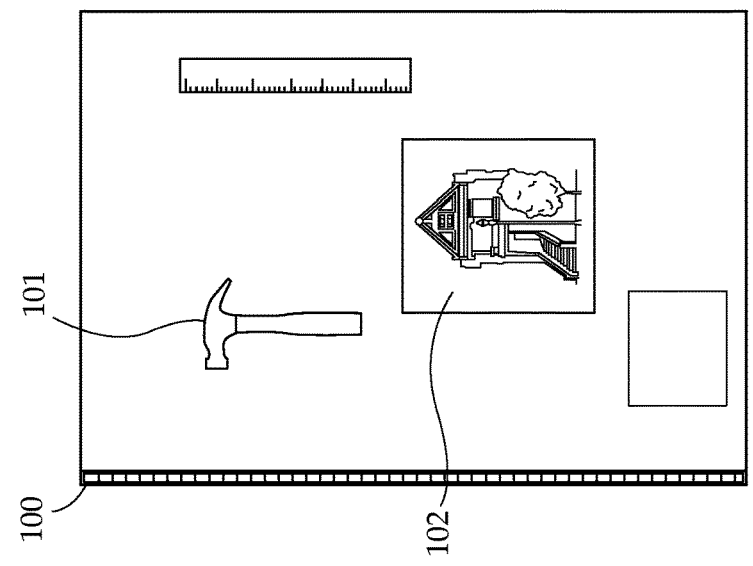
FIG. 18 illustrates a frontal view of an embodiment of the present invention, namely a workbench board with permanent outlines for tool and instrument placement.

Another embodiment of this invention is a tool organizational board 100 as seen in FIG. 18. This board can feature permanent imbedded ink outlines of tools 101 or other labels for organization 102. This function allows organization without the outlines wearing off or being ruined, and can be customized. Also, as many times tools come in varied sizes and shapes (even the same tools made by different manufacturers), it may not be beneficial to have permanent outlines, so the user may choose to outline the tools with any marker whatsoever, and should they decide to move these tools as others are added or deleted, simply erase the outlines. The idea of outlining the tools is invaluable as the user will know when a tool is missing. This is also beneficial as the user may want to write in the outline or next to the item how many items are on a particular hanging device 411, 412, thus making it valuable for inventory purposes. For example, the user may not only know where the paint brush belongs, but how many paint brushes are on any particular hanging device. This durable, lightweight, tool organization board, unlike current pegboards, also acts as a white board for notes, as well as a tack board. These boards are easily installed over any surface whatsoever and need no clearance for hanging devices.

Figure 19:
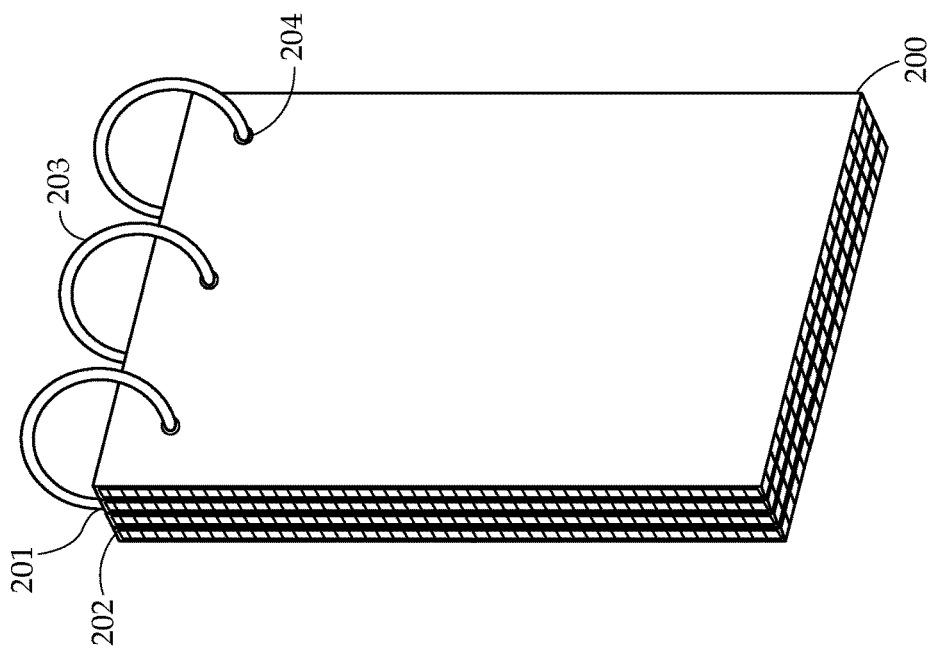
FIG. 19 illustrates a frontal view of an embodiment of the present invention, namely a book of multiple sheets of corrugated plastic, complied using rings and without any permanent imaging.
Figure 20:
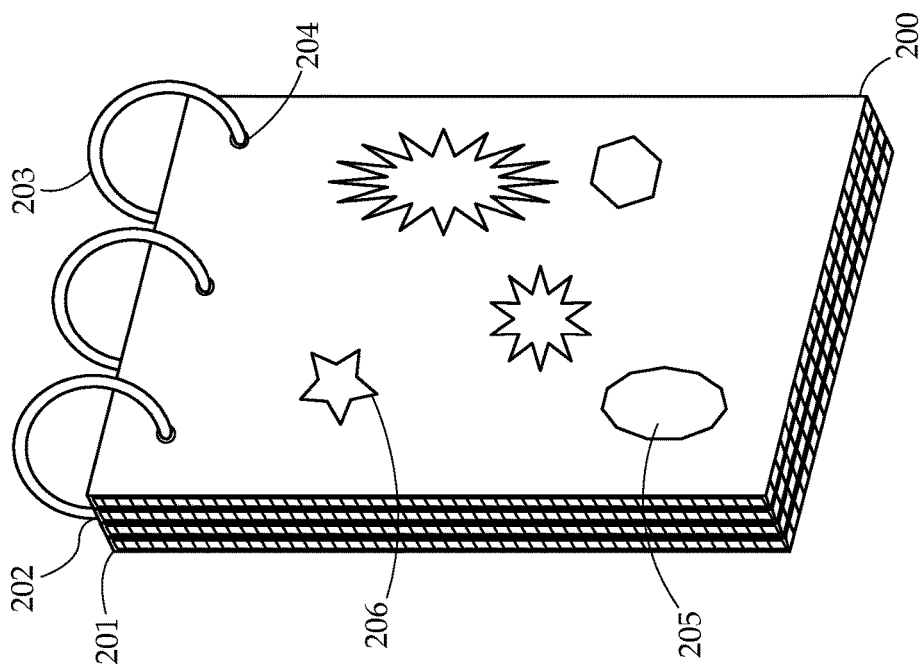
FIG. 20 illustrates a frontal view of an embodiment of the present invention, namely a book of multiple sheets of corrugated plastic, complied using rings and with any permanent imaging.

Another embodiment of this invention is a notepad 200 as seen in FIGS. 19, 20. The notepad features multiple sheets 201, 202 that are assembled by punching holes in the sheets 204 and inserting rings 203. These rings 203 can be made of metal, plastic or any other composite material and can vary in size depending on the number of sheets desired. The rings 203 could feature a clip or other device which would allow the rings to open and for sheets to be removed or additional sheets added. The notepad 200 could be used for grocery lists or other task lists around the home, or could be used in place of children's coloring books. In FIG. 20 the notepad 200 could feature permanent drawings, such as the symbols and shapes 205, 206 used in the drawing or any other image. With a permanent design the notepad 200 could easily be used as a child's coloring book, or teaching aids for children.

Figure 21:
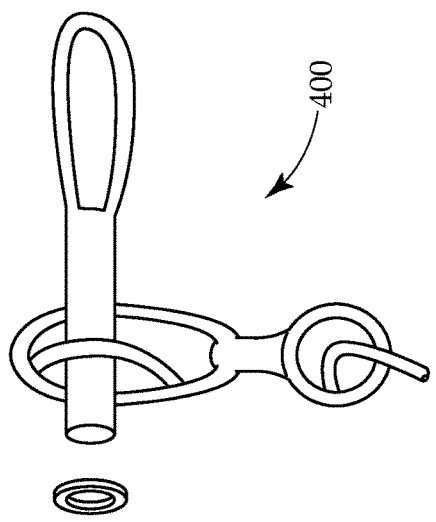
FIG. 21 illustrates a frontal view of a clasp that could be used to reversibly fasten various sheets of corrugated plastic sheet together.
Figure 22:
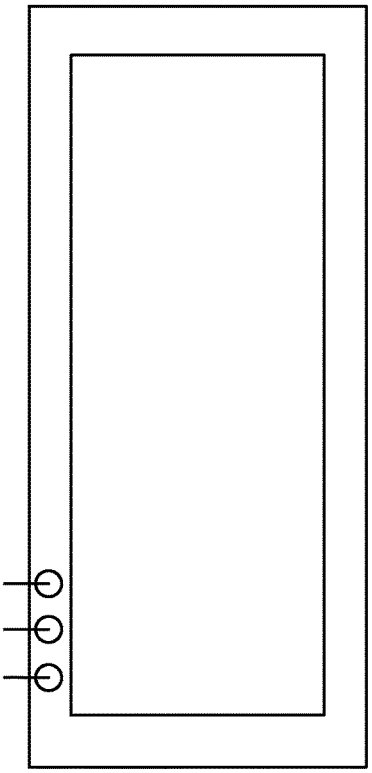
FIG. 22 illustrates a photograph capable smart phone or tablet. As an alternative to typing textual messages or placing images into a transmission by the smart phone, a message could be permanently or erasably written or sketched on a piece of the corrugated plastic sheet. The user could then take a picture of the text or image and e-mail that picture to a user who would then be able to receive and read the message. This would be particularly useful for users who were not comfortable or skillful using the tiny keyboards normally available on smart phones or tablets. Because the message could be one of several messages prepared ahead of time and only photographed and transmitted at the appropriate time, this process could provide some unique capabilities.

In order to create containers or closable elements with the material as shown in FIG. 5 and FIG. 6 a clasp can be used. Such a clasp 400 is shown in FIG. 21.

As mentioned throughout, the permanent writable and erasable capabilities discussed herein may be adapted to several embodiments and may even be utilized to refinish entire rooms or even play houses for children in order to create an artistic, write erasable environment which may also include embedded, permanent images such as artistic renderings, paintings, interactive board games such tic-tac-toe and others, learning materials or any number of graphic images as the art provides.

In one embodiment, a dual sided hanging display apparatus, which can also be converted into several other applicable apparatuses, is existent. The dual sided hanging display apparatus may comprise at least one polymeric erasable board having writable and erasable surfaces comprising, a front panel and a rear panel. The front panel and the rear panel may be interconnected by a set of parallel members in a substantially perpendicular disposition to both the front panel and the rear panel.

The dual sided hanging display apparatus may further comprise non-erasable imbedded images within the front panel and the rear panel further. And, the dual sided hanging display apparatus may further comprise a set of laminate screen members adhered to the set of outer surfaces of the front panel and the rear panel. Additionally, the front panel and the rear panel further may comprise a glycol ether erasable coating. Also, an alcohol base eraser system may be used on pen whereas the glycol ether embodiment is better adapted for permanent markers.

In an additional embodiment of the instant system of corrugated, writable and erasable apparatuses, a corrugated polymeric binding mechanism comprising a uni-planar construction which additionally comprises two, three, twenty or more panels is illustrated. And in one embodiment, the corrugated polymeric binding mechanism may comprise a first panel comprising two sides, a second panel comprising two sides and one or more hinge mechanisms. In practice, the first panel and the second panel may be rotatably attached by the hinge mechanism and in one embodiment the two sides of the first panel and the two sides of the second panel comprise a write erasable material. The corrugated polymeric binding mechanism may also double as a self-standing display face array.

The corrugated polymeric binding mechanism may comprise three panels, twenty panels or more, and two or more hinge mechanisms to accommodate the number of panels and display faces utilized. Furthermore, the corrugated polymeric notebook may define one or more internally disposed storage areas, depending upon the number of panels and display faces utilized. Moreover, the panels or display faces of the corrugated polymeric binding mechanism may also comprise a permanently applied printed under coat image and may also comprise a set of laminate screen members adhered to the set of outer surfaces.

Figure 26A:
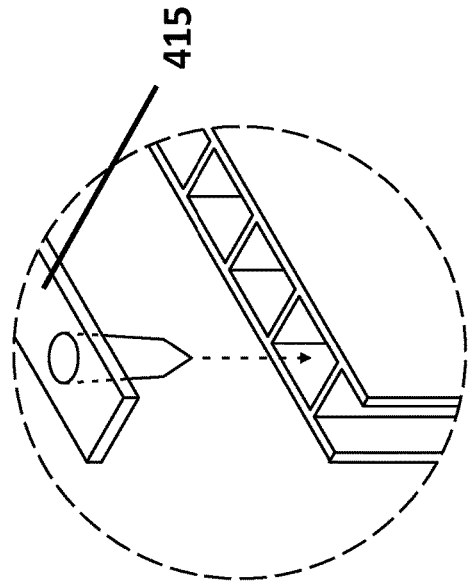
FIGS. 26, 26A and 26B illustrate a rear isometric views of a multipronged pin apparatus including a rubberized or polymer protection mechanism.
Figure 26B:
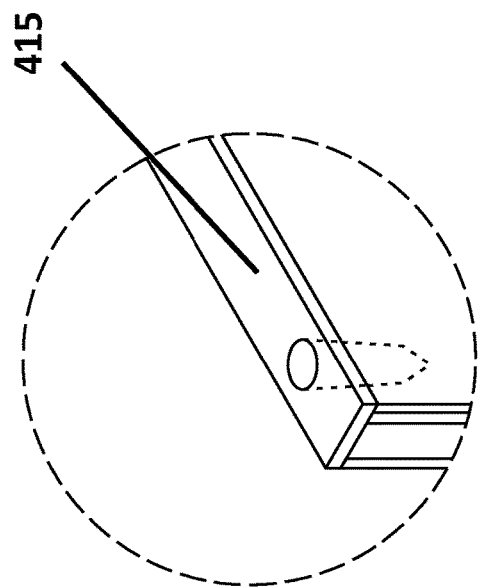
Figure 26:
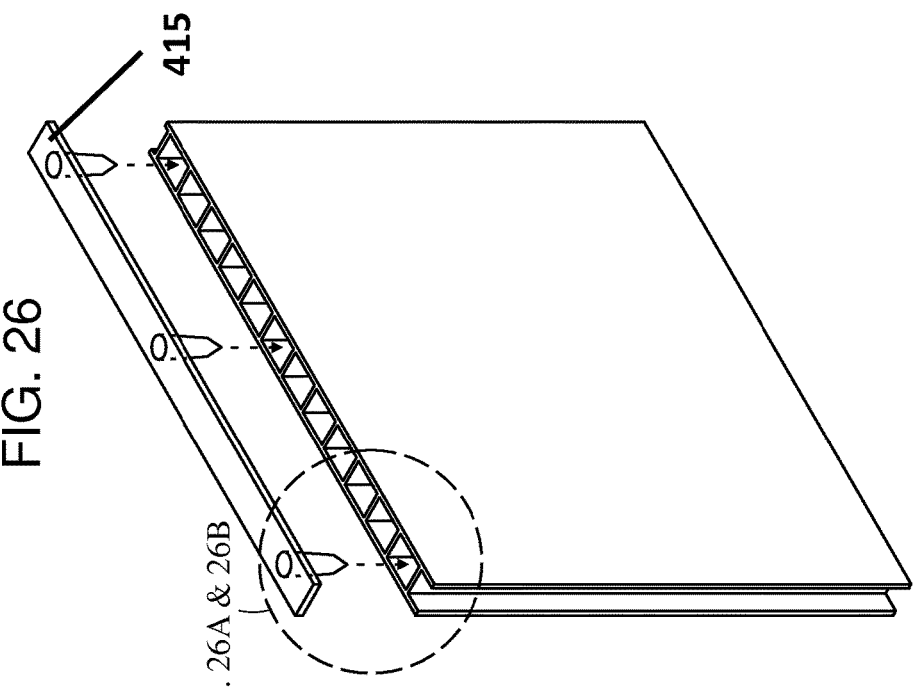

In a further embodiment, FIGS. 26, 26A and 26B illustrate a rear isometric views of a multipronged pin apparatus including a rubberized or polymer protection mechanism.

In a further embodiment, a multi-function, write erasable, storage and/or carrying case 30, also including but not limited to, tool box 30, or mailbox 30, which may be utilized as a tool case may be revealed. This case may include a flexible, foldable handle 33, 420 in FIG. 28 which may take shapes, such as a triangular arrangement, for one instance only. The storage/carrying apparatus 30 may comprise a set of corrugated upper interlocked partition members 31 wherein the interlocked partition members 31 are disposed in the same plane comprising a set of inner surfaces and a set of outer surfaces, at least one corrugated lower partition member, and at least one corrugated handle member comprising at least one through aperture 421. The handle 33, 420 may take numerous shapes in different embodiments for instance, the corrugated handle member may comprise a centrally disposed hinge mechanism and at least two corrugated handle members with two though apertures, wherein each of the handle members includes one of the two apertures.

Figure 28:
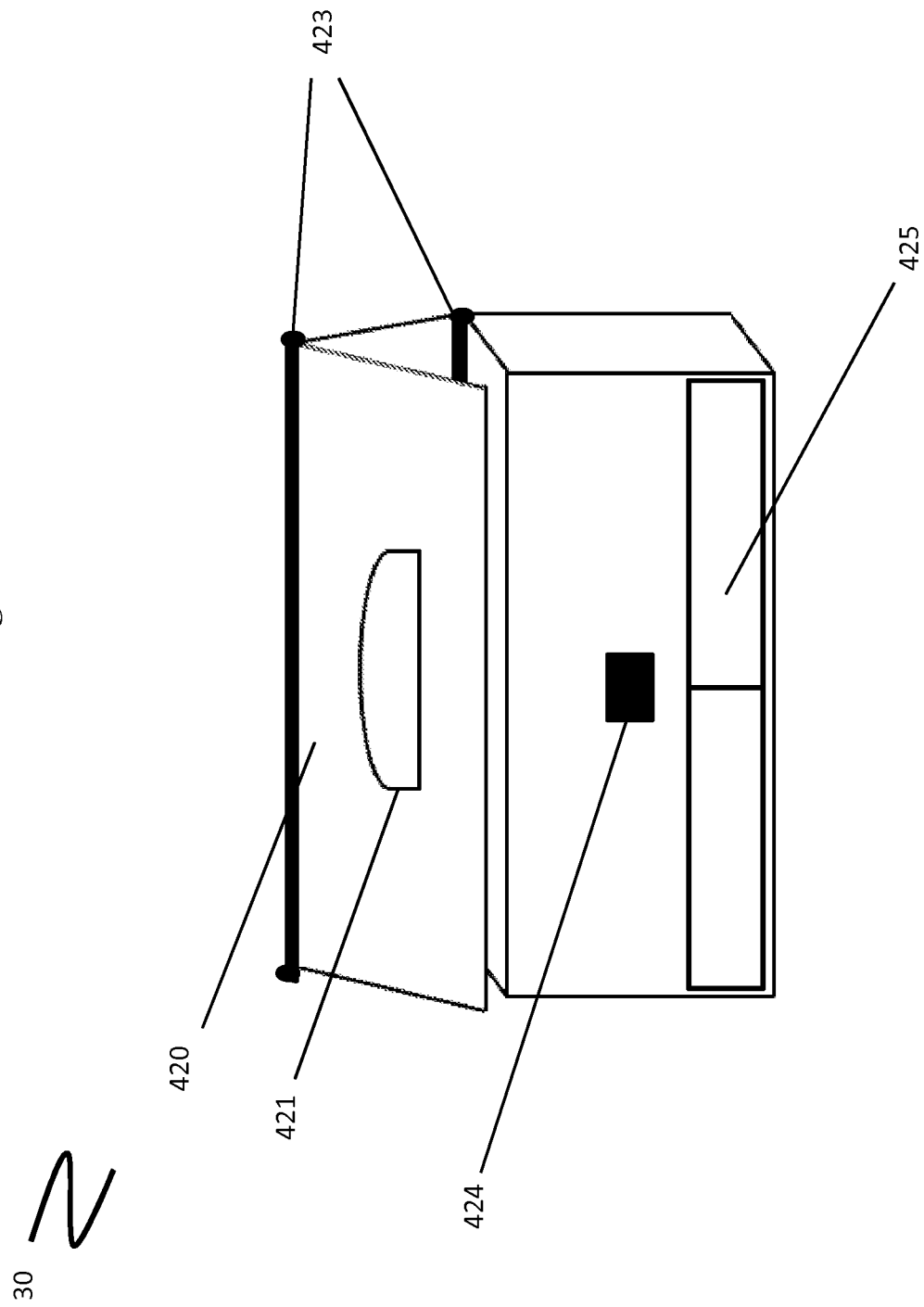
FIG. 28 illustrates a multipurpose, write erasable, storage and/or carrying case apparatus which may be configured to allow for the mounted mailbox, a mounted or portable toolbox, a storage bin system, a stackable bin system and any number of storage or containment apparatuses.

Furthermore, each individual of the set of interlocked partition members may comprise a pair of outer members and a set of inner rib members and the set of interlocked partition members may comprise five interlocked partition members and the set of interlocked partition members comprises six interlocked partition members. Furthermore, the corrugated handle member may be attached by a hinge mechanism 423 to the upper edge of an individual of the set of corrugated upper interlocked partition members and the handle member may also possess a divided handle portion with a hinge mechanism 423 to add extra flexibility. Thus, the handle may comprise two individual members in rotatable communication and the entire unit in rotatable communication. Like all of the other apparatuses revealed herein, including but not limited the reversible boards, notebooks, and binders, the instant toolbox or mailbox may comprise pockets 425 for storage as illustrated in FIG. 28.

The storage apparatus may also comprise a substantially rectangular shape wherein all outer surfaces comprise erasable surfaces, a permanently applied printed under coat image and a set of laminate screen members which may be adhered to the set of outer surfaces. Moreover, the instant embodiment may also comprise a wall mounting system using any of the clipping, affixing or adhering mechanisms illustrated in FIGS. 23-28, including physical clips, screws or VELCRO® hook-and-loop fasteners, or any other affixing mechanism known in the art, which thus reveals an added functionality to the system as additional clips may be clipped into three outer walls that are not clipped or mounted. Thus, the storage apparatus may comprise a portable or mountable storage apparatus which, by utilizing the numerous slots inherent through the corrugated construction, allows for the mounted mailbox, a mounted or portable toolbox, a storage bin system, a stackable bin system and any number of storage or containment apparatuses.

In an additional embodiment, a reinforced composite writable structural element is revealed. Additionally, the reinforced composite writable structural element may comprise an outer layer, a median layer and an inner layer wherein the outer layer is attached to the median layer in a perpendicular manner and the median layer is attached to the inner layer in a perpendicular manner. The outer layer is composed of a thermoplastic polymer and may comprise a permanently applied printed under coat image and a set of laminate screen members adhered to the set of outer surfaces.

The reinforced composite writable structural element may be utilized to manufacture products selected from the group consisting of a writable pictures, peg boards, doghouses, birdhouses, tool sheds, yard sheds, ice-fishing sheds, toy boxes, doll houses, white boards, containers, displays, frames, notebooks, children's toys, books, pegboards, lap tables, easels, signage, storage organizations, saw horses and write-erasable wall coverings.

In an exemplary embodiment, a corrugated notebook device is revealed, this device may comprise at least two parallel planar members joined by a set of interior rectangular members in perpendicular relation to the two parallel planar members. Furthermore, at least one segment of an individual of the at least two parallel planar members may be severed in at least one point between two individual of the set of interior rectangular members to form at least two facing members in hinged communication. Additionally, at least two of the parallel planar members may severed at two points between two individual of the set of interior rectangular members to form a hinge and the system may comprise between 3 and 20 of the facing members. Moreover, the facing members may comprise a permanently applied printed under coat image and a set of laminate screen members adhered to the set of outer surfaces.

FIGS. 32A, 32B and 32C further illustrates the corrugated notebook device and more specifically illustrates the device in its open form 480, closed form 460, and open form in use as a self standing display array 470.

The corrugated notebook device in FIG. 32A may be used as a write erasable binder, that naturally holds paper due to the inherent rigidity of the polymeric erasable boards. These binders may also be used in conjunction with current paper fasteners, including stick on and punch through types currently used for paper binders, yet are more durable than current products, as well as waterproof, thus protecting important paperwork and documents more efficiently than paper binders. These polymeric erasable binders, due to the durable nature and natural flexibility of the corrugated plastic sheets, may be used by lawyers, doctors, professionals, students, construction personnel, to protect and organize important paperwork from damage and rain, while simultaneously giving the user a write erasable clipboard, binder, notebook.

The corrugated notebook device may also be adjustable, depending on the user's needs. By increasing the space between the double back slits 481, this creates more storage space for additional paperwork, or even a pad of paper.

Furthermore, these corrugated notebook devices, when used as a self standing display array, make great presentation boards as well as filling the need in daycare centers for separating children during sleep time, or any temporary enclosure. There is currently a need for an economical, lightweight product that may be used to separate sleeping children in daycare centers that cannot hurt the child should it fall on them inadvertently. This feature, combined with permanent printing of ABC'S, graphs, color in profiles, to do lists, or any image whatsoever (maybe the daycare centers logo), provides some unique capabilities in the learning and daycare fields. In practice, these self standing display arrays may only have three or four parallel planar members. Lastly, when not in use, these extremely durable, cleanable devices are very easily stored, and if hung on a wall may appear as a picture.

In a complementary embodiment, FIG. 33 introduces a lightweight, write erasable, re-usable, durable, foldable project display board, similar in fashion to current cardboard products currently on the market, yet more compact when completely folded. FIG. 33 more specifically illustrates this embodiment in its open form 570, and its open form as a self standing display array 560, 580.

This write erasable, foldable, project display board has contains all of the qualities of the corrugated note book device but is made utilizing a different combination of two single back slits 571 of equal distance from each edge and one double back slit 481 in the center, allowing the project display board to be folded into a neat, more easily storable, compact unit.

This write erasable, foldable, project display board, has inherent graph like qualities by utilizing the inherent lines of the corrugations for graphs, charts, or to keep writing straight. Furthermore, unlike current cardboard products, it is impervious to water and rain, is not damaged by tapes, and is much more durable and re-usable. Also, like all of the other apparatuses revealed herein, may comprise pockets for storage and a permanently applied undercoat image as well as a set of laminate screen members adhered to the set of outer surfaces.

FIGS. 34A, 34B and 34C reveals a multi functional, combination polymeric erasable white board, peg board, tack board, sticky board, and open storage box in one product. More specifically, FIGS. 34A, 34B and 34C illustrates the multi functional, combination polymeric erasable white board, peg board, tack board, sticky board, and open storage box from a top view 600, a front view 610, and a three dimensional view 620.

This multi functional, combination polymeric erasable white board, peg board, tack board, sticky board, and open storage box may be back slit or severed halfway through the corrugated plastic sheet, perpendicular to corrugations, at two equal distant points to form a substantially rectangular u shape. A second polymeric erasable board 621 would be permanently attached at the rear, or back of the box portion to provide additional strength, as well as additional open corrugations for attachment of interlocked partition members 622, 623. These interlocked partition members may be made of corrugated plastic 622 and attached using pins 418 (as seen in FIG. 27), or solid plastic 623 with two legs inserted into the front and rear open corrugations of the device substantially rectangular u-shaped portion of the device. Also, the solid plastic interlocked partition members may have a protrusion, or nub 625 on one of the two legs to further lock the partition member in place.

Furthermore, a third (or more) polymeric erasable board, 624, may be permanently attached to the back of the device to provide more open corrugations to act as receivers of hanging devices, 411, 412. These pockets, or overlays may also act as storage for any important flat items.

Figure 35B:
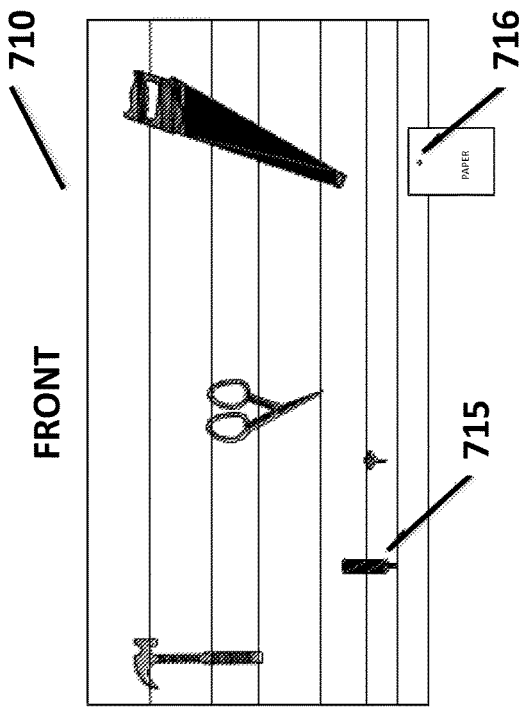
FIGS. 35A, 35B and 35C illustrates the multiple layers of polymeric erasable boards from a front view, a side view, and a three dimensional view.
Figure 35C:
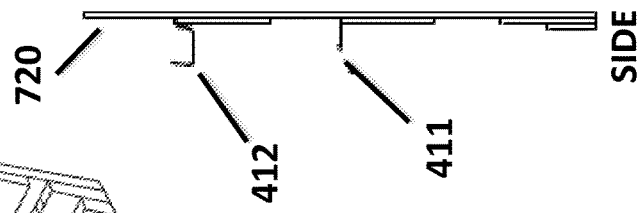
Figure 35A:
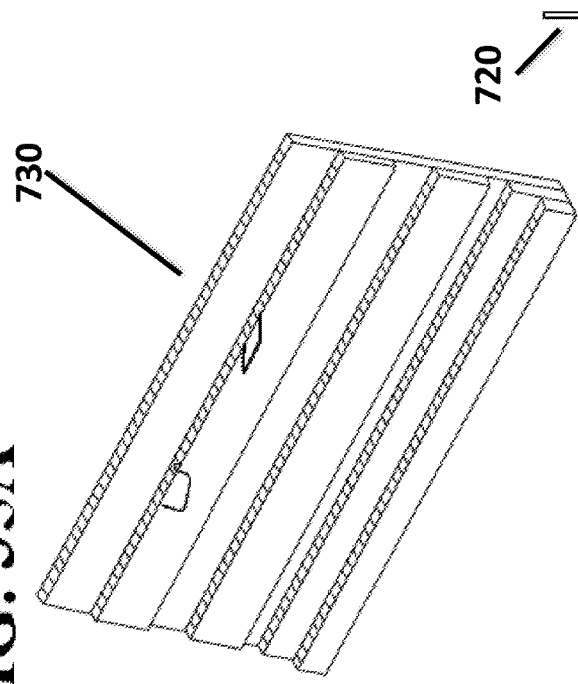

FIGS. 35A, 35B and 35C further illustrates the use of multiple layers of the polymeric erasable boards. More specifically, FIGS. 35A, 35B and 35C shows the multiple layers of polymeric erasable boards from a front view 710, a side view 720, and a three dimensional view 730. These overlays or pockets may be of any smaller size, color, or shape, and installed in any manner whatsoever, though usually rectangular and with open corrugations facing upward. These additional layers of polymeric erasable boards provide additional strength and may be utilized with all embodiments herein.

There are multiple benefits to utilizing additional layers of polymeric erasable board. One benefit focuses on the fact that the additional open corrugations allow for the use of additional hanging devices 411, 412 for hanging of a myriad of items. Examples would be earring boards, key boards, tool boards, and in the home or office settings for items such as scissors, tapes, computer cords and accessories, or any hang able item.

And, the additional layers of polymeric erasable boards may act as a pocket for storage of any flat items. Examples would be business cards, paper, envelopes, checks, documents, cd's or dvd's, cell phones, or any inherently flat item.

Third, this is an ideal area to be used as a designated tack board area 716, as shown in FIGS. 35A, 35B and 35C. As the user may not want to tack into the writing area of the board and leave a pin hole in the surface (as well as possibly going through the rear surface), they would tack into the pocket, or overlay, so as to not protrude through the back, or second side of the board. These pockets may be of different shapes and different colors or even black, so the holes from the tacks or push pins are not readily visible.

These pockets, or secondary overlays of corrugated plastic sheet, also allow the user the option of inserting and storing items directly within the open corrugations. As current corrugated plastic sheets come in different sizes ranging from 2 millimeter to 10 millimeter, many different items may be organized this way. For example, 10 millimeter works great for holding most screwdrivers 715 as shown in FIG. 35A, and pliers, yet 4 millimeter works best for pens, pencils, and screw bits. These and a myriad of other items may be inserted directly into the open corrugations.

In an added embodiment, a combined flexible saw horse and signage apparatus is illustrated comprising a first leg comprising a series of rectangular receiving areas and an outer writable and erasable surface, a second leg comprising a series of rectangular receiving areas corresponding with the first leg comprising a series of rectangular receiving areas. The combined flexible saw horse and signage apparatus my also comprise a removably attached joiner apparatus which may comprise at least two interconnecting pin mechanisms, wherein the removably attached joiner apparatus may be inserted simultaneously into the first leg comprising a series of rectangular receiving areas and the second leg comprising a series of rectangular receiving areas. And, the two interconnecting pin mechanisms may comprise four interconnecting pin mechanisms and the outer writable and erasable surface may comprise a permanently applied printed under coat image and a set of laminate screen members adhered to the set of outer surfaces.

In an additional configuration, a combined signage, projection receiving/displaying and peg board system which may comprise a storage and attachment member comprising a set of vertically disposed rectangular receiving pocket members defined and formed from two parallel members attached by a set of perpendicular joinder members and a removably affixed attachment mechanism. The combined signage, projection receiving/displaying and peg board system may also comprise a reversible sign member comprising at least two parallel members attached by a set of perpendicular joinder members which define a set of rectangular areas and at least two write erasable outer surfaces. And, the combined signage, projection receiving/displaying and peg board system may also comprise at least one retaining mechanism comprising an outer diameter substantially equal to the set of rectangular areas, and the at least one retaining mechanism may be removably attachable and attached.

In addition, the attachment mechanism of the combined sign, projection receiving/displaying and peg board system may comprise an outer diameter substantially equal to the diameter of the largest possible circular member inscribed within an individual of the set of rectangular areas and may also comprise an outer area substantially equal to an inner area of an individual of the set of rectangular areas. Moreover, the at least one retaining mechanism may comprise 10, 20 or as many retaining mechanisms as may be fitted within the confines of the specifically designed apparatus. The retaining mechanisms may be selected from the group consisting of fitted pegs, fitted eye hooks 413, dowel pins, and cotter pins 418 and multipronged pegs 410 as illustrated in FIGS. 23-28 and as the state of the art dictates.

Further, most materials may be utilized for the fastening members, including hard and soft metals, polymers, hardened polymers, composites, including carbon fiber as the situation and the state of the art dictate. Finally, the combined sign, projection and peg board system may comprise a permanently applied printed under coat image and a set of laminate screen members adhered to the set of outer surfaces for enhanced printing and erasability.

In a complementary embodiment, a reversible peg board and dry marker board system is revealed and this system may comprise at least two parallel rectangular sheets of extruded, polypropylene copolymer in communication with a set of substantially rectangular joinder members comprising extruded, polypropylene copolymer. To further enhance the system, at least one removably attached mounting member and a set of removably attached peg mechanisms may be utilized. To enhance the capability of the system, the reversible peg board and dry marker board may attach a set of removably attached peg mechanisms selected from the group consisting of u-bolts, c-bolts, j-bolts, eye bolts, hangar bolts, screw eye bolts, forges eye bolts, wire eye bolts, wire eye lags, pins, cotter pins, elevator bolts, rivets, blind rivets and these pegs may comprise materials selected from the group consisting of stainless steel, zinc plated steel, brass, silicon bronze, polymers, and composites. The parallel rectangular sheets of extruded, polypropylene copolymer may comprise a permanently applied printed under coat image adhered to a set of outer surfaces and may comprise a set of laminate screen members adhered to a set of outer surfaces.

Figure 36:
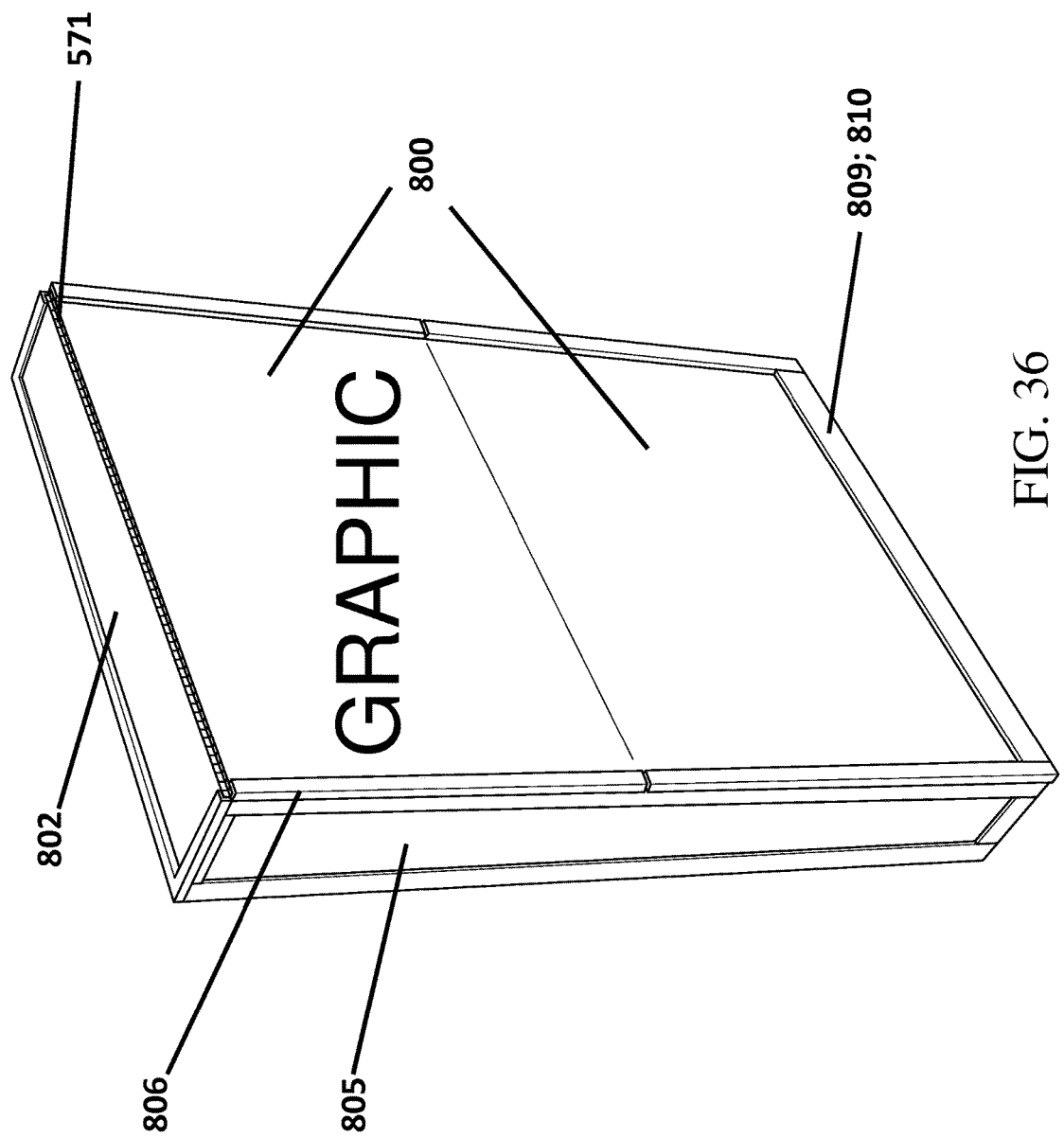
FIG. 36 illustrates the multifunctional, totally enclosed cabinet, designed to appear as a picture, painting or any other graphic representation.

In an exemplary embodiment, FIG. 36 introduces a multifunctional, totally enclosed cabinet, designed to appear as a picture, painting or any other graphic representation. The front cover exterior 800 would appear as the graphic representation of the user's choice, surrounded by a perforated decorative trim 809, which, in one embodiment, would be held together by a set of protruding pins, 810. The space behind the graphic representation may contain interconnecting decorative trim 806 that allows for hidden storage, a peg board surface, or even a white board. This multifunctional cabinet has all of the qualities of the corrugated note book device but is made utilizing a different combination of two single back slits 571. These back slits 571 and a folded side 805 create living hinges and open corrugations.

FIGS. 37 and 38 illustrate the multifunctional cabinet from a "flat" perspective on both sides. The figures also show the combination of back slits forms the front cover, both interior and exterior 801, 800, top portion of the device 802, rear interior and exterior 803, 804, and storage boxes at the top 808 and bottom 807 of the device that are only revealed when the device is open (see also FIG. 41). The sides are constructed using two folds on each side portion 805.

Figure 39:
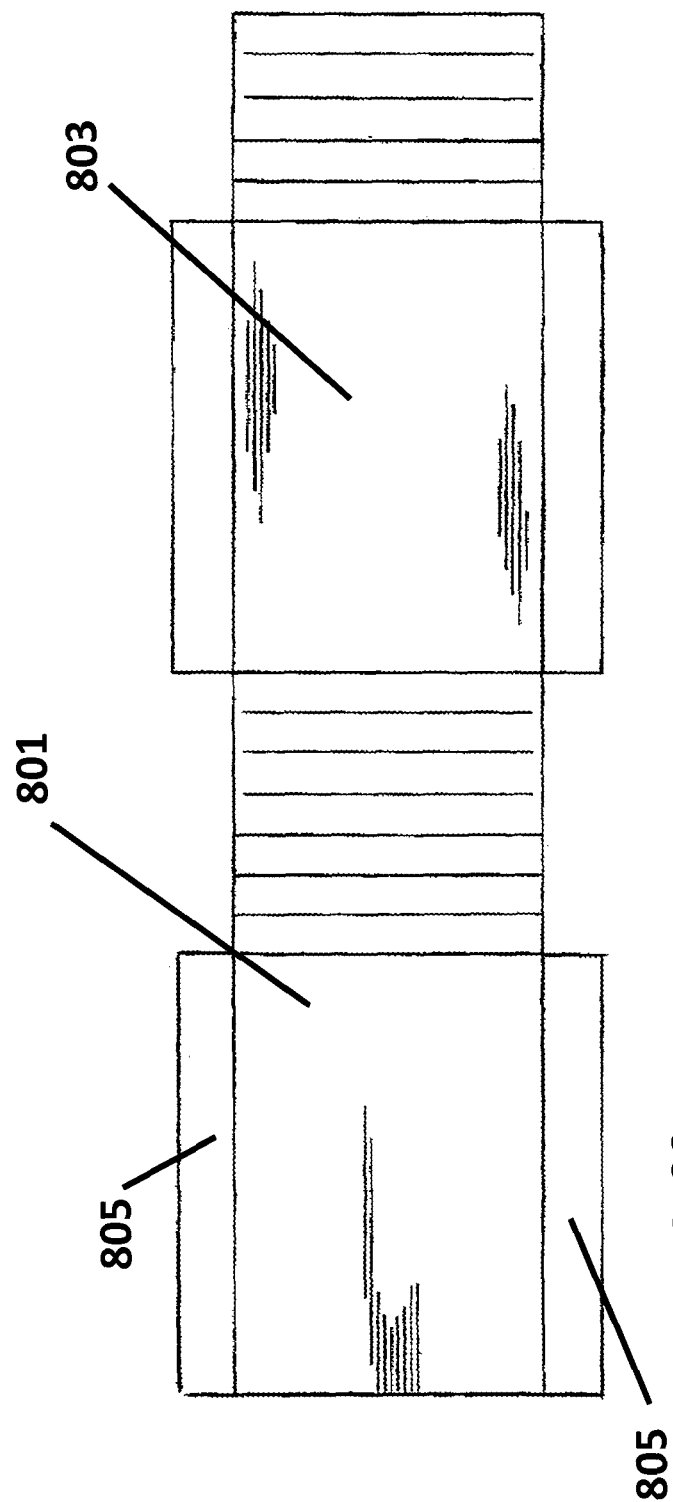
FIG. 39 illustrates a front view of the multifunctional cabinet in a fully unassembled state, further illustrating the option of having folded sides for the front cover.

FIG. 39 also shows the multifunctional cabinet from a "flat" perspective. It also shows the option of having folded sides for the front cover 801. These folds may hide most of the trim that makes up the cabinet. The folded sides could be designed and imprinted in numerous ways to further the illusion of being solely a picture and not a cabinet storage space.

Figure 41:
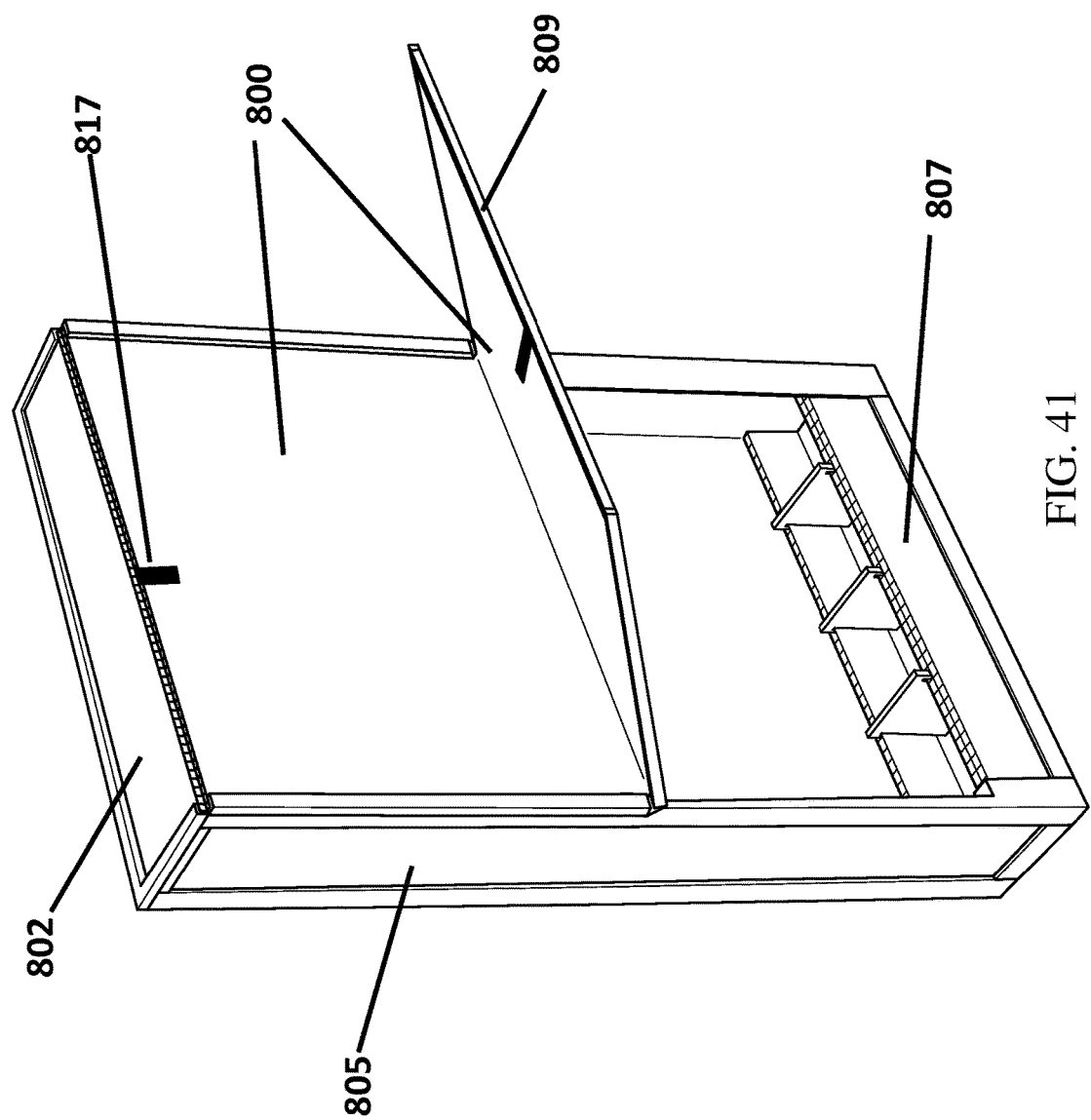
FIG. 41 illustrates the multifunctional cabinet from a three dimensional front view, and more specifically, shows the cabinet in a half open position, revealing the bottom box portion of the device and the closure system.

FIG. 41 shows the multifunctional cabinet from a three dimensional front view, and more specifically, shows the cabinet in a half open position, revealing the bottom box portion, 807 of the device. The half opened portion can be held up to the top portion, 802, by a steel plug, 817. A standard magnet system (or other such system as matching and hook-and-loop fasteners, clip system, compression systems or depression system) would allow the bottom portion to stay open for use. The interior of the bottom portion of the front cover may be used as a white board type area.

Figure 40:
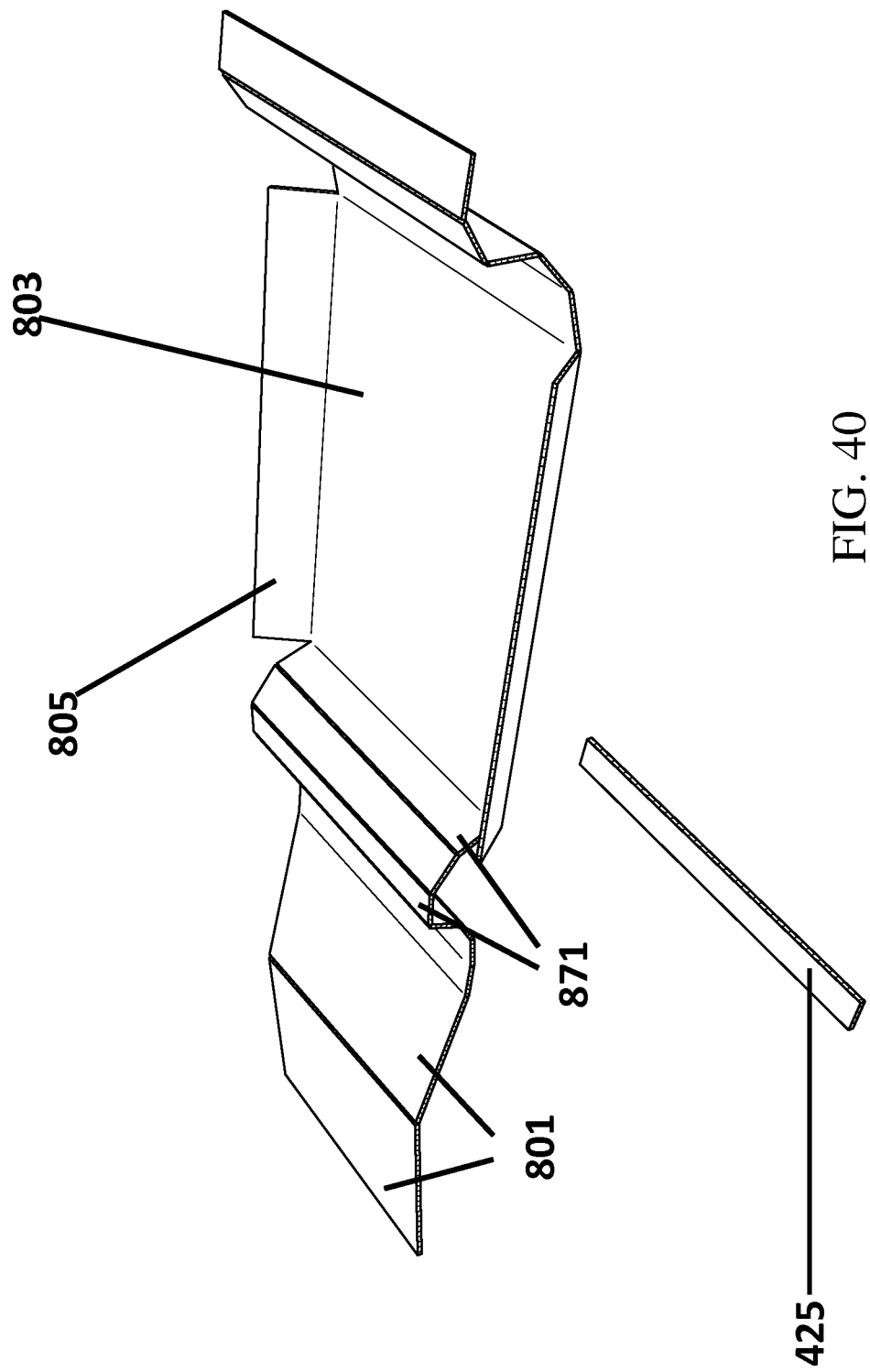
FIG. 40 illustrates a front view of the multifunctional cabinet in a semi unassembled state wherein the folding process has begun.

The multifunctional cabinet, like all of the other apparatuses revealed herein, may comprise pocket overlays, 425 for storage like it is shown in FIG. 40. FIG. 42 shows the multifunctional cabinet in its open position utilizing the pocket overlay, 425, in use with a hanging device, 411. One or more of these pocket overlays, 425, may be attached to the rear interior 803, of the cabinet for increased functionality and hanging capacity for commonly used items.

Figure 45:
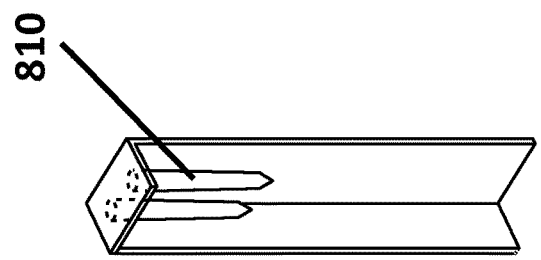
FIG. 45 additionally illustrate the manner in which the trim is connected using the protruding pins.
Figure 44:
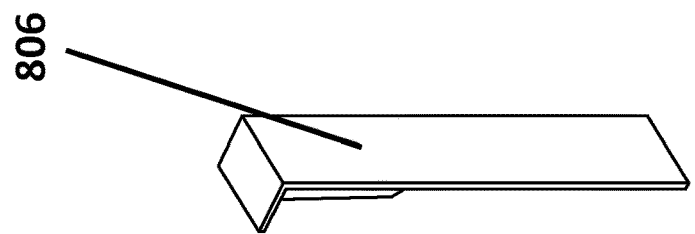
FIG. 44 illustrates the manner in which the trim is connected using the protruding pins.
Figure 43:
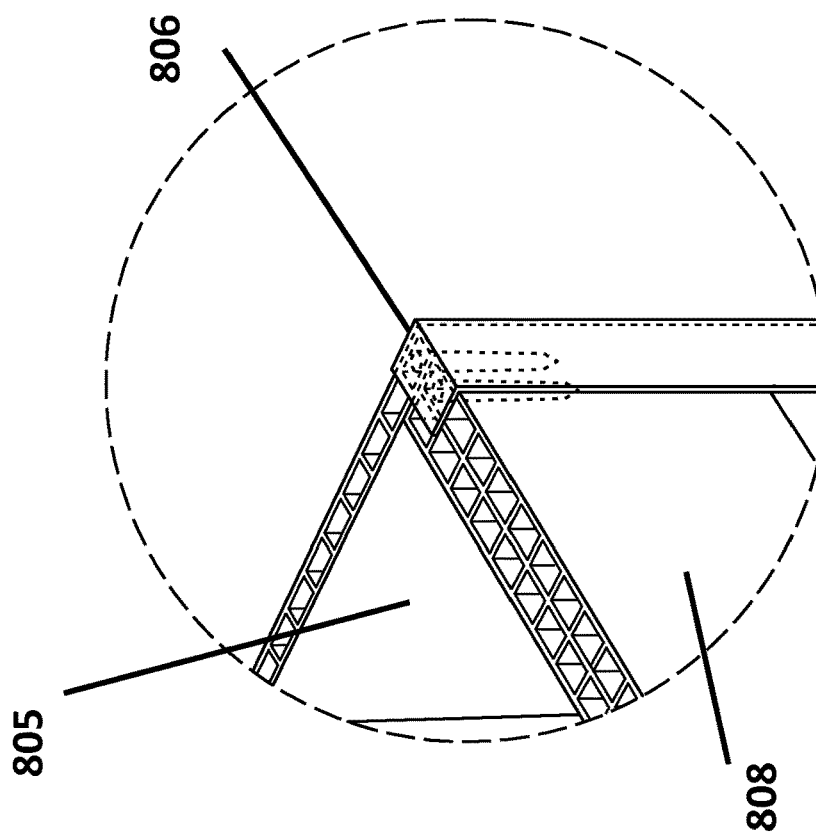
FIG. 43 exemplifies how the folded side, the top box, and the bottom box are attached by way of the trim.

FIGS. 43-45 illustrate the interconnecting decorative trim 806 that may compose the border of the multifunctional cabinet. FIGS. 43-45 additionally illustrate the manner in which the trim is connected using the protruding pins 810. Specifically, FIG. 43 exemplifies how the folded side, the top box, and the bottom box are attached by way of the trim. The protruding pins 810 enter into the open corrugations of the folded side 805, and the top box, 808 or can also be introduced to the bottom box (bottom box not shown in FIG. 43).

Figure 46:
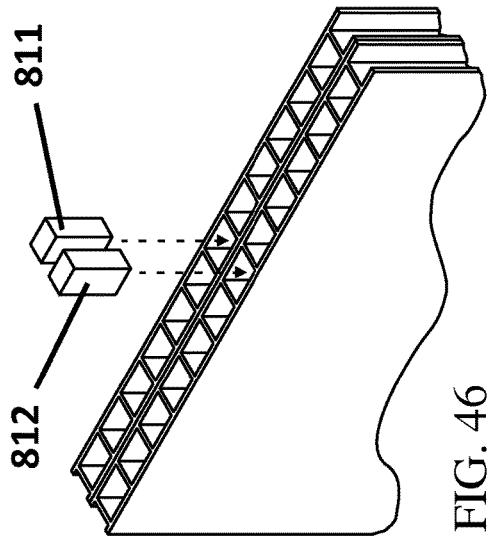
FIG. 46 is a cutaway isometric view illustrating the use of a set of metal plug inserts and a set of magnet plug inserts.
Figure 47:
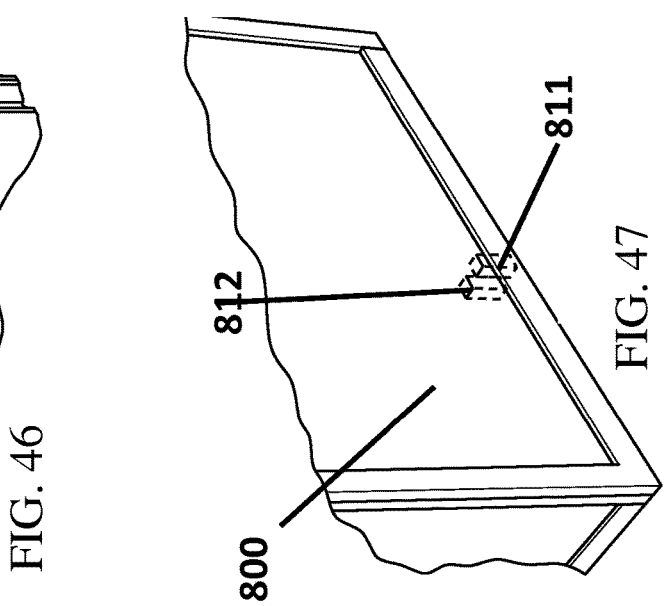
FIG. 47 is a cutaway isometric view illustrating the use of a set of metal plug inserts and a set of magnet plug inserts.

FIGS. 46-47 demonstrate the use of a set of metal plug inserts 812, and a set of magnet plug inserts 811. These inserts may eliminate the need for an external type of fastening system to hang or keep the multifunctional cabinet open or closed. The magnetic plug inserts may also be used in other embodiments of this apparatus as a fastening system. Additionally, the magnet plug inserts may vary in length and when inserted also act as hidden magnetic force for attachment of other magnets.

Figure 48:
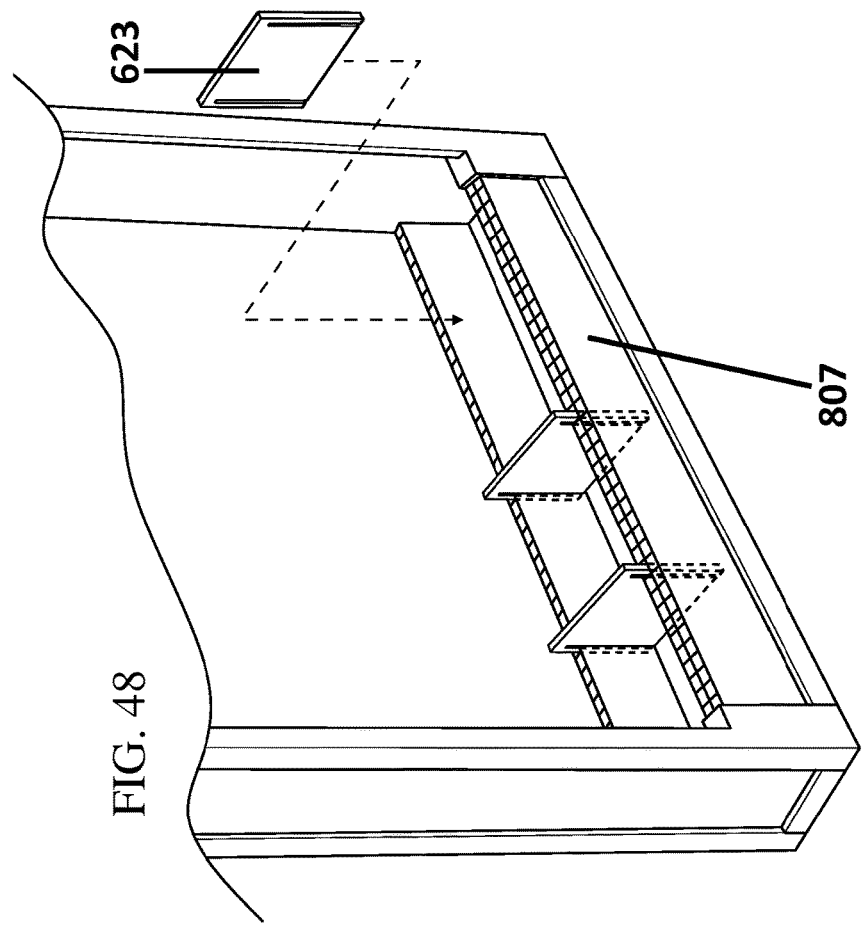
FIG. 48 is a cutaway isometric view illustrating the bottom portion of the multifunctional cabinet apparatus wherein the bottom storage box is located.

FIG. 48 illustrates the bottom portion of the multifunctional cabinet apparatus wherein the bottom storage box, 807, is located and can be separated in different sections by the solid interlock partition member, 623 in FIG. 49, which illustrates an exploded view of the solid interlock partition member.

FIG. 49 shows the perforated (or solid) decorative trim, 809, and protruding pins, 810, which secure the trim to the polymeric erasable boards. The perforated, decorative trim allows for the use of different hanging devices, 411, 412, 815, 816 to be utilized through the perforations. The protruding pins may vary in length whatsoever as needed to secure the folded sides to the boxes.

FIG. 50 illustrates an isometric view of the perforated (or solid) decorative trim and protruding pins which secure the trim to the polymeric erasable boards. The perforated, decorative trim allows for the use of different hanging devices to be utilized through the perforations.

FIG. 51 illustrates a single pronged hanging device that may be utilized in conjunction with many of the apparatuses described herein. FIG. 52 illustrates the single pronged hanging device of FIG. 51 utilized within an apparatus. FIG. 53 illustrates a three pronged hanging device utilized within an apparatus. FIG. 54 illustrates a two pronged mirror image hanging device utilized within an apparatus.

What I claim is:

1. A removably attachable cabinet system comprising:
   a set of panels comprising:
      a front panel comprising corrugated write-erasable polymeric material and further comprising an inner section and an exterior section;
      a rear panel comprising corrugated write-erasable polymeric material and further comprising an inner section and an exterior section;
      a top section comprising corrugated write-erasable polymeric material and further comprising an inner section and an exterior section;
      a bottom section comprising corrugated write-erasable polymeric material and further comprising an inner section and an exterior section;
      a set of side panels comprising corrugated write-erasable polymeric material and further comprising an inner section and an outer section; wherein the exterior section of the front panel comprises an area for a graphic representation; and
   at least one removably attached pin comprising at least two legs, wherein at least one of the at least two legs is seated within a set of corrugated portions of the set of panels and wherein at least one of the at least two legs extends outwardly from the removably attachable cabinet system and is disposed as a hanging device to receive objects.

2. The removably attachable cabinet system of claim 1 wherein an area space behind the graphic representation comprises an interconnecting decorative trim system comprising a work surface selected from the group consisting of a hidden storage compartment, a peg board surface, and a polymeric erasable surface.

3. The removably attachable cabinet system of claim 1 further comprising at least two single back slits and a folded side wherein the combination of the at least two single back slits and the folded side creates a set of living hinges and open corrugations.

4. The removably attachable cabinet system of claim 1 wherein the exterior section of the front panel comprises a set of folded sides designed and imprinted with a graphic representation.

5. The removably attachable cabinet system of claim 1 further comprising a set of removably attached metal plug inserts disposed to fit snugly within the set of corrugated portions of the set of panels.

6. The removably attachable cabinet system of claim 1 further comprising a set of magnet plug inserts which comprise an internal fastening system.

7. The removably attachable cabinet system of claim 1 further comprising a solid interlock partition member.

8. The removably attachable cabinet system of claim 1, comprising a multipronged pin apparatus wherein the multipronged pin apparatus comprises at least two legs, the at least two legs comprising two sets of opposing legs wherein the angle between the two sets of opposing legs is ninety degrees and wherein the multipronged pin apparatus comprises at least two legs to eliminate rotation on the corners of the removably attachable cabinet system.

9. The removably attachable cabinet system of claim 1 further wherein each individual of the set of side panels further comprises a fold.

10. The removably attachable cabinet system of claim 9 further comprising a set of interior storage mechanisms at the top section and a set of interior storage mechanisms at the bottom section wherein the set of interior storage mechanisms at the top section and the set of interior storage mechanisms at the bottom section are created from the set of two folds.

11. The removably attachable cabinet system of claim 1 further comprising a decorative trim comprising a set of removably attached protruding pins, wherein the removably attached protruding pins press fit within the set of corrugated portions of the set of panels and wherein the graphic representation is surrounded by the decorative trim and wherein the decorative trim is held together by the set of protruding pins.

12. The removably attachable cabinet system of claim 11 wherein the decorative trim is disposed to receive a set of hanging devices.

13. The removably attachable cabinet system of claim 11 wherein each individual of the set of protruding pins varies in length with respect to each other individual of the set of protruding pins in order to secure the set of side panels.

14. The removably attachable cabinet system of claim 8 wherein an angle between the at least two legs of the multipronged pin apparatus is selected from the group consisting of: 30 degrees, 45 degrees, 90 degrees, and 120 degrees and wherein the multipronged pin apparatus comprises a shape selected from the group consisting of: L-shaped and U-shaped.

15. The removably attachable cabinet system of claim 8 wherein the multipronged pin apparatus comprises a number of pins selected from the group consisting of: two pins, four pins, six pins and ten pins.

16. The removably attachable cabinet system of claim 8 further comprising a bottom storage box mechanism comprising at least one removably attached solid interlock partition member for separation of the bottom storage box mechanism into different sections.

17. The removably attachable cabinet system of claim 16 wherein the at least one removably attached solid interlock partition member for separation of the bottom storage box mechanism into different sections comprises a set of protrusions for latching with the bottom storage box mechanism.

* * * * *